United States Patent [19]

Nishimura et al.

[11] 4,293,913
[45] Oct. 6, 1981

[54] NUMERICAL CONTROLLER FOR A GRINDING MACHINE

[75] Inventors: Hideo Nishimura, Aichi; Takao Yoneda, Toyoake; Minoru Enomoto, Ohbu, all of Japan

[73] Assignee: Toyoda Koki Kabushiki Kaisha, Kariya, Japan

[21] Appl. No.: 60,678

[22] Filed: Jul. 25, 1979

[30] Foreign Application Priority Data

Jul. 28, 1978 [JP] Japan .................................. 53-92771

[51] Int. Cl.³ ...................... B24B 51/00; G06F 15/46
[52] U.S. Cl. ............................... 364/474; 51/165.71; 364/104; 364/107
[58] Field of Search ............... 364/104, 107, 117, 118, 364/474; 51/165.71, 165.74, 165 TP

[56] References Cited

U.S. PATENT DOCUMENTS

| | | | |
|---|---|---|---|
| 4,079,235 | 3/1978 | Froyd et al. ..................... | 364/474 X |
| 4,080,759 | 3/1978 | Klar et al. ..................... | 51/165.71 X |
| 4,084,349 | 4/1978 | Farrell ......................... | 51/165.71 X |
| 4,122,634 | 10/1978 | Nishimura et al. ............... | 51/165.71 |
| 4,136,390 | 1/1979 | Farrell et al. .................... | 364/474 |

*Primary Examiner*—Felix D. Gruber
*Attorney, Agent, or Firm*—Oblon, Fisher, Spivak, McClelland & Maier

[57] ABSTRACT

A numerical controller having a digital computer with a memory device, a feed control device responsive to feed control data supplied from the computer for controlling the servomechanisms of a grinding machine, a data write-in device manually operable for inputting various data and instructions, and a plurality of pilot lamps controllable by the computer. The write-in device is operable to input grinding mode designation data, responsive to which the computer serves to illuminate one by one those of the lamps which request the operator to input control parameters necessary for the grinding control in the designated grinding mode. The write-in device is further operable to input the control parameters designated by the illuminated lamps for storage in the memory device. The memory device has stored therein a number of operational sequence programs prescribing the manners in which the grinding machine is to be operated in respective grinding modes. The computer, when receiving an automatic grinding instruction, serves to read out from the memory device the control parameters and one of the operational sequence programs necessary for the grinding control in a designated one of the grinding modes and then, to supply to the feed control device the feed control data after calculating the same from the read-out control parameters and the read-out one of the operational sequence programs.

17 Claims, 34 Drawing Figures

| 0 | DATA SETTING FLAG | |
|---|---|---|
| 1 | GRINDING STEP FLAG | |
| 2 | GRINDING MODE | |
| 3 | WHEEL HEAD INFEED START POSITION | (HIGH DIGITS) |
| 4 | | (MID. DIGITS) |
| 5 | | (LOW DIGITS) |
| 6 | TABLE INDEX POSITION | (HIGH DIGITS) |
| 7 | | (MID. DIGITS) |
| 8 | | (LOW DIGITS) |
| 9 | FINISH DIA. | (HIGH DIGITS) |
| ⋮ | ⋮ | |
| 51 | SPARK-OUT TIME | (HIGH DIGITS) |
| 52 | | (LOW DIGITS) |

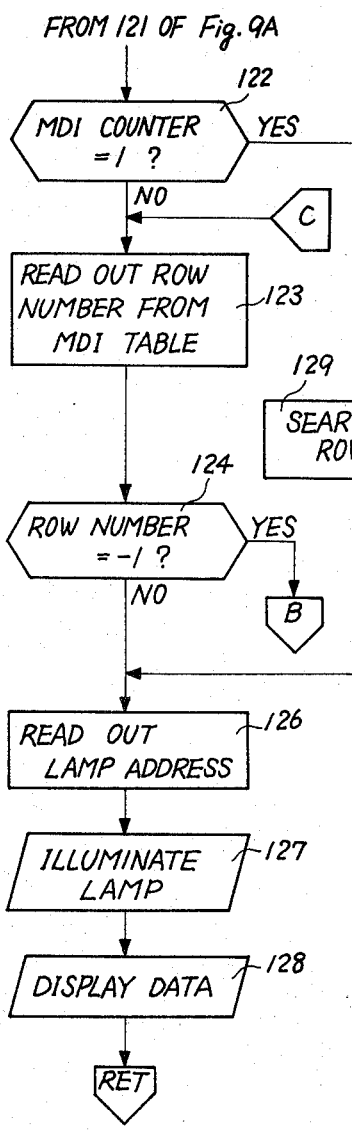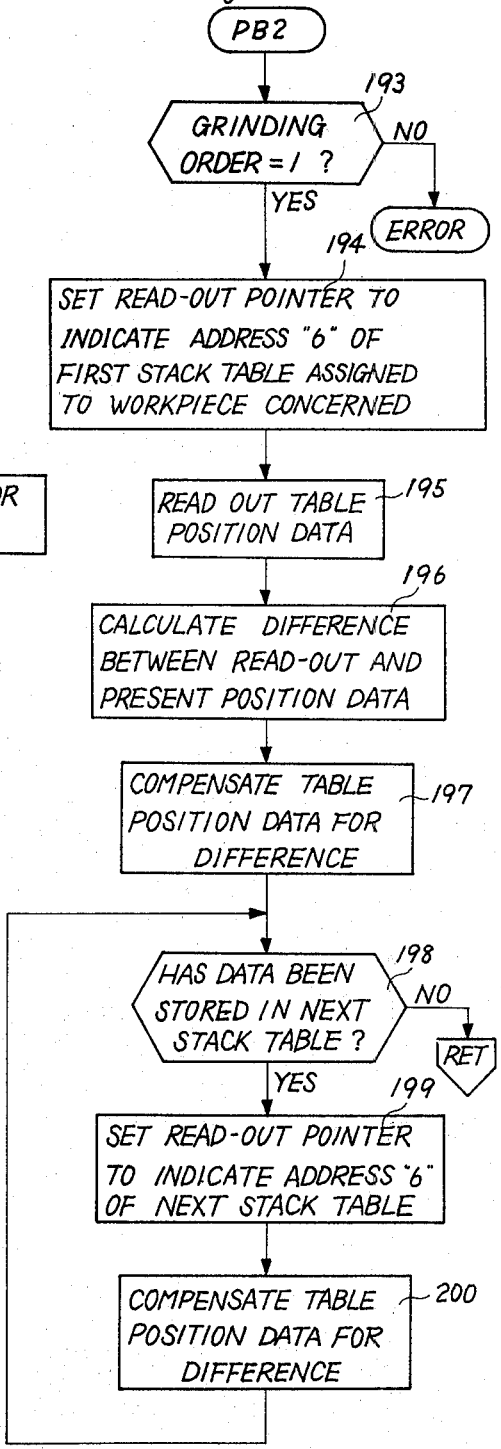

Fig. 11

| ROW NO. | LABEL OF LAMP | STACK TABLE ADDRESS | LAMP I/O ADDRESS | LAMP BIT POSITION |
|---|---|---|---|---|
| 0 | GRINDING MODE | 2 | E036 | 2 |
| 1 | WHEEL INFEED START POS. | 3 | E036 | 3 |
| 2 | TABLE INDEX POSITION | 6 | E036 | 4 |
| 3 | FINISH DIAMETER | 9 | E036 | 5 |
| 4 | POST-GRINDING DRESSING | 12 | E036 | 6 |
| 5 | TRAVERSE STROKE | 13 | E036 | 7 |
| 6 | WHEEL POSITION | 16 | E038 | 0 |
| 7 | TABLE POSITION | 19 | E038 | 1 |
| 8 | STROKE | 22 | E038 | 2 |
| 9 | FEED RATE | 25 | E038 | 3 |
| 10 | INFEED AMOUNT | 27 | E038 | 4 |
| 11 | NUMBER OF TIMES | 30 | E038 | 5 |
| 12 | DRESSING INTERVAL | 31 | E038 | 6 |
| 13 | ZERO-INFEED | 32 | E038 | 7 |
| 14 | AIR-CUT AMOUNT | 33 | E03A | 0 |
| 15 | AIR-CUT FEED RATE | 35 | E03A | 1 |
| 16 | ROUGH INFEED AMOUNT | 37 | E03A | 2 |
| 17 | ROUGH INFEED RATE | 39 | E03A | 3 |
| 18 | INFEED STOP PERIOD | 41 | E03A | 4 |
| ⋮ | ⋮ | ⋮ | ⋮ | ⋮ |
| 62 | NUMBER OF SPARK-OUT TIMES | 16 | E03C | 9 |
| 63 | TARRY PERIOD OF TIME | 17 | E03C | 10 |

Fig. 12

| GRINDING MODE & ORDER | COUNT VALUE OF MDI COUNTER | | | | | | | | | | | | | | | | | | | | | | | | | |
|---|---|---|---|---|---|---|---|---|---|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 |
| MODE 1 ORDER 01 | 0 | 1 | 2 | 3 | 4 | 6 | 7 | 8 | 9 | 10 | 11 | 12 | 13 | 14 | 15 | 16 | 17 | 18 | 19 | 20 | 21 | 22 | -1 | | | |
| MODE 2 ORDER 01 | 0 | 1 | 2 | 3 | 4 | 6 | 7 | 8 | 9 | 10 | 11 | 12 | 13 | 14 | 15 | 16 | 17 | 18 | 19 | 20 | 21 | 22 | 23 | -1 | | |
| MODE 3,5,7 ORDER 01 | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 34 | -1 |
| MODE 4,6,8 ORDER 01 | 0 | 1 | 2 | 3 | 4 | 5 | 6 | 7 | 8 | 9 | 10 | 11 | 12 | 13 | 24 | 25 | 26 | 27 | 28 | 29 | 30 | 31 | 32 | 34 | -1 | |
| MODE 1 ORDER 02-10 | 0 | 1 | 2 | 3 | 4 | 14 | 15 | 16 | 17 | 18 | 19 | 20 | 21 | 22 | 24 | 25 | 26 | 27 | 28 | 29 | 30 | 31 | 32 | 33 | 34 | |
| MODE 2 ORDER 02-10 | 0 | 1 | 2 | 3 | 4 | 14 | 15 | 16 | 17 | 18 | 19 | 20 | 21 | 22 | 23 | -1 | | | | | | | | | | |
| MODE 3,5,7 ORDER 02-10 | 0 | 1 | 2 | 3 | 4 | 5 | 24 | 25 | 26 | 27 | 28 | 29 | 30 | 31 | 32 | 34 | -1 | | | | | | | | | |
| MODE 4,6,8 ORDER 02-10 | 0 | 1 | 2 | 3 | 4 | 5 | 24 | 25 | 26 | 27 | 28 | 29 | 30 | 31 | 32 | 33 | 34 | -1 | | | | | | | | |
| ORDER 20 | 35 | 36 | 37 | 38 | 39 | 40 | 41 | 42 | -1 | | | | | | | | | | | | | | | | | |
| ORDER 21 | 43 | 44 | 45 | 46 | 47 | 48 | 49 | 50 | 51 | 52 | -1 | | | | | | | | | | | | | | | |
| ORDER 22 | 53 | 54 | 55 | 56 | 57 | 58 | 59 | 60 | 61 | 62 | 63 | -1 | | | | | | | | | | | | | | |
| MODE 11,12 | 0 | 2 | -1 | | | | | | | | | | | | | | | | | | | | | | | |

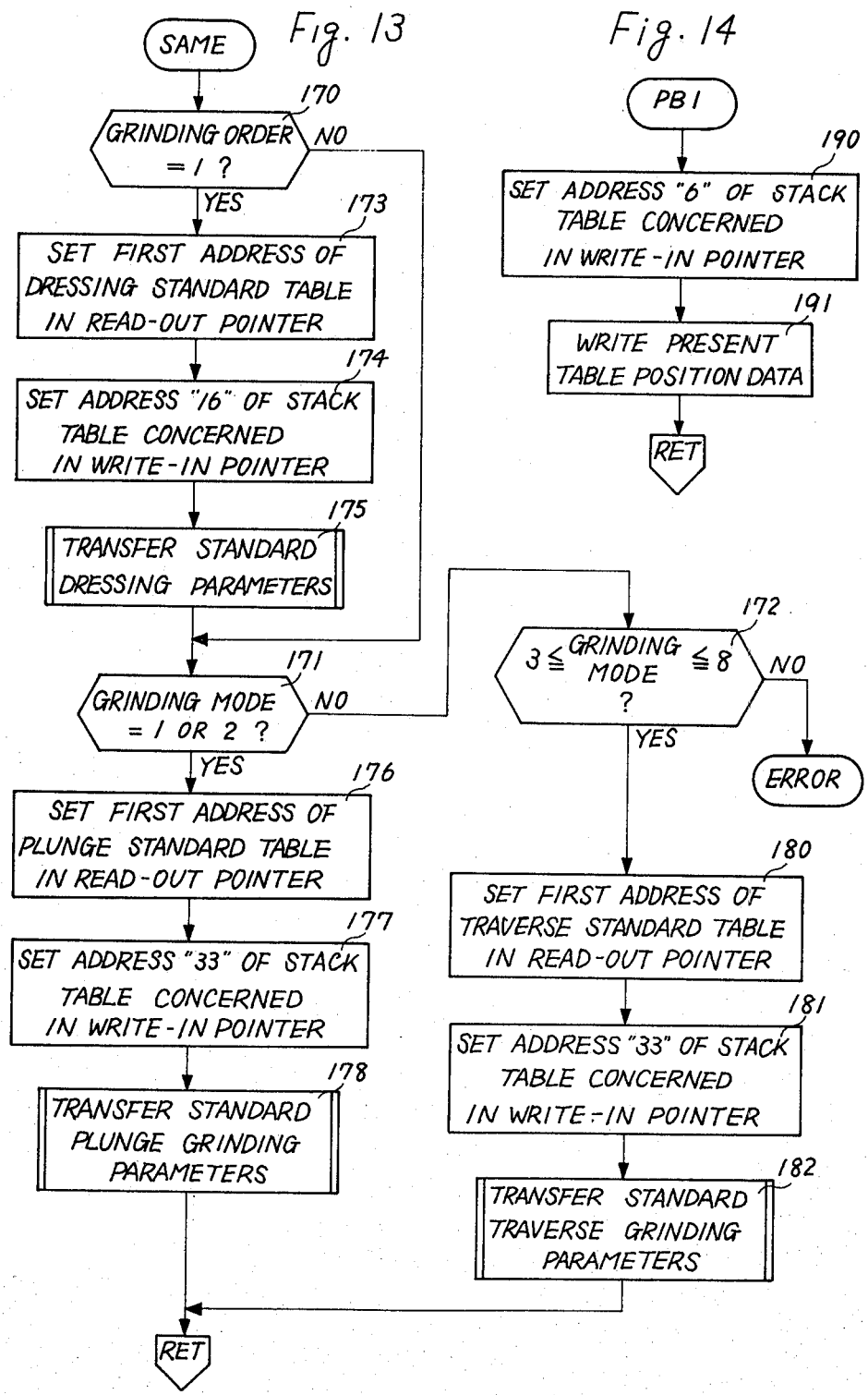

Fig. 17
| SE-QUENCE NO. | OPERATION | SUB-ROUTINE NO. | NEXT STEP NO. | JUMP DESTIN. NO. |
|---|---|---|---|---|
| 0 | CHECKING OF START CONDITIONS | 4 | 1 | |
| 1 | INITIALIZE TRAVERSE DATA TABLE | 24 | 2 | |
| 2 | TRAVERSE TABLE INDEX | 36 | 3 | |
| 3 | HYDRAULIC FEED OF WHEEL | 39 | 4 | |
| 4 | CONFIRMATION OF HYDRAULIC FEED | 30 | 5 | |
| 5 | END | -1 | | |
Fig. 21
| SE-QUENCE NO. | OPERATION | SUB-ROUTINE NO. | NEXT STEP NO. | JUMP DESTIN. NO. |
|---|---|---|---|---|
| 0 | INITIALIZE TRAVERSE DATA TABLE | 24 | 1 | |
| 1 | TRAVERSE TABLE INDEX | 36 | 2 | |
| 2 | END | -1 | | |
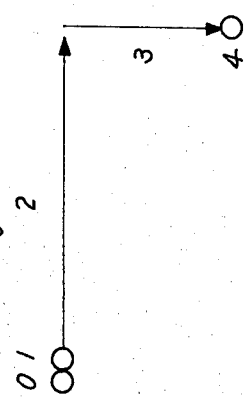
Fig. 16
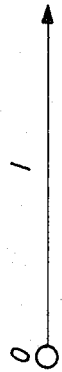
Fig. 20

Fig. 19

| SE-QUENCE NO. | OPERATION | SUB-ROUTINE NO. | NEXT STEP NO. | JUMP DESTIN. NO. |
|---|---|---|---|---|
| 0 | INITIALIZE PLUNGE DATA TABLE | 21 | 1 | |
| 1 | WHEEL RAPID FEED | 36 | 2 | |
| 2 | WHEEL AIR-CUT INFEED | 36 | 3 | |
| 3 | SIZING DEVICE ADVANCE | 39 | 4 | |
| 4 | CONFIRMATION OF ISSUANCE OF AS1 | 30 | 6 | 5 |
| 5 | WHEEL ROUGH INFEED | 38 | 4 | |
| 6 | CONFIRMATION OF ISSUANCE OF AS2 | 30 | 8 | 7 |
| 7 | WHEEL FINE INFEED | 38 | 6 | |
| 8 | CONFIRMAITION OF ISSUANCE OF AS3 | 30 | 10 | 9 |
| 9 | WHEEL FINISH INFEED | 38 | 8 | |
| 10 | SIZING DEVICE RETRACTION | 22 | 11 | |
| 11 | WHEEL OVER-RUN CHECKING | 31 | 12 | |
| 12 | WHEEL RAPID RETRACTION | 37 | 13 | |
| 13 | END | -1 | | |

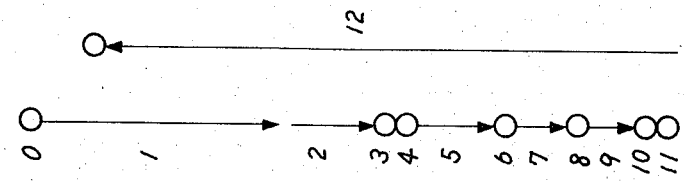

Fig. 18

| SE-QUENCE NO. | OPERATION | SUB-ROUTINE NO. | NEXT STEP NO. | JUMP DESTIN. NO. |
|---|---|---|---|---|
| 0 | INITIALIZE TRAVERSE DATA TABLE | 22 | 1 | |
| 1 | WHEEL RAPID FEED | 36 | 2 | |
| 2 | CHECKING OF NUMBER OF ROUGH TRAVERSE TIMES | 28 | 8 | 3 |
| 3 | WHEEL ROUGH INFEED | 36 | 4 | |
| 4 | TABLE LEFTWARD TRAVERSE | 36 | 5 | |

| | (Fig. 23A) | | | |
|---|---|---|---|---|
| 5 | CHECKING OF NUMBER OF ROUGH TRAVERSE TIMES | 28 | 11 | 6 |
| 6 | WHEEL ROUGH INFEED | 36 | 7 | |
| 7 | TABLE RIGHTWARD TRAVERSE | 36 | 2 | |
| 8 | CHECKING OF NUMBER OF FINE TRAVERSE TIMES | 28 | 14 | 9 |
| 9 | WHEEL FINE INFEED | 36 | 10 | |
| 10 | TABLE LEFTWARD TRAVERSE | 36 | 11 | |
| 11 | CHECKING OF NUMBER OF FINE TRAVERSE TIMES | 28 | 17 | 12 |
| 12 | WHEEL FINE INFEED | 36 | 13 | |
| 13 | TABLE RIGHTWARD TRAVERSE | 36 | 8 | |
| 14 | CHECKING OF NUMBER OF FINISH TRAVERSE TIMES | 28 | 20 | 15 |
| 15 | WHEEL FINISH INFEED | 36 | 16 | |
| 16 | TABLE LEFTWARD TRAVERSE | 36 | 17 | |
| 17 | CHECKING OF NUMBER OF FINISH TRAVERSE TIMES | 28 | 22 | 18 |
| 18 | WHEEL FINISH INFEED | 36 | 19 | |
| 19 | TABLE RIGHTWARD TRAVERSE | 36 | 14 | |
| 20 | CHECKING OF NUMBER OF SPARK-OUT TRAVERSE TIMES | 28 | 24 | 21 |
| 21 | TABLE LEFTWARD TRAVERSE | 36 | 22 | |
| 22 | CHECKING OF NUMBER OF SPARK-OUT TRAVERSE TIMES | 28 | 24 | 23 |
| 23 | TABLE RIGHTWARD TRAVERSE | 36 | 20 | |
| 24 | WHEEL RAPID RETRACTION | 37 | 25 | |
| 25 | END | -1 | | |

NUMERICAL CONTROLLER FOR A GRINDING MACHINE

BACKGROUND OF THE INVENTION

1. Field of the Invention

The present invention relates in general to a numerical control system for a machine tool. More particularly, it relates to a numerical controller for controlling the operation of, preferably, a cylindrical grinding machine in accordance with numerical control information.

2. Description of the Prior Art

Generally, the grinding of a cylindrical workpiece surface is performed in one of various grinding modes such as a size control plunge grinding mode, a dead-stop traverse grinding mode and the like which is chosen taking into consideration the length of the ground surface, the required accuracy of finish, the profiles of portions adjoining opposite ends of the ground surface, and other various conditions. In the case where such grinding operation is controlled by means of a conventional numerical controller, there must be prepared a numerical control program which effects the relative movement between a wheel head and a traverse table of a grinding machine in accordance with a sequence cycle appropriate to a desired grinding mode. The preparation of such a control program is laborious. Particularly, in the case where a workpiece has a number of surfaces to be ground in respectively different grinding modes, the numerical control program prepared therein must be so programmed as to grind the surfaces in the respectively appropriate grinding modes, and this causes the operator to spend a great deal of effort and much time.

As noted above, various grinding modes are used in the conventional grinding of cylindrical workpieces which can be assorted through an analysis of the relative movement between the wheel head and the traverse table draws. For example, the grinding modes which can be chosen for external grinding of cylindrical workpieces or workpiece surfaces are assorted into eight kinds as shown in the following TABLE 1.

TABLE 1

| Symbol | Kind of Mode |
|---|---|
| 1 | Size control plunge grinding |
| 2 | Dead-stop plunge grinding |
| 3 | Opposite-end infeed size control traverse grinding |
| 4 | Opposite-end infeed dead-stop traverse grinding |
| 5 | Left-end infeed size control traverse grinding |
| 6 | Left-end infeed dead-stop traverse grinding |
| 7 | Right-end infeed size control traverse grinding |
| 8 | Right-end infeed dead-stop traverse grinding |

The grinding modes prescribe respective fixed sequence cycles in accordance with which the wheel head and the traverse table are to be moved. Accordingly, under the same technical concept as those known numerical controllers which have been developed for control of drilling, boring and turning operations, an attempt may be made to provide the numerical controller that stores the above-noted fixed sequence cycles and that is capable of controlling the grinding operation in accordance with any designated one of the fixed sequence cycles. In the numerical controller so provided, the preparation of the numerical control program used for grinding a workpiece can be made easily because the numerical control program is completed only by designating one of the fixed sequence cycles and inputting to the numerical controller various control variables or parameters such as feed rate, feed amount, spark-out period of time, the number of traverse times and the like which are necessary for the execution of the designated sequence cycle. However, the control parameters that the operator manually inputs to the numerical controller are not only large in number, but also have to be changed in correspondence to the kind of the designated grinding mode. Therefore, it is also required for the operator to choose the control parameters which are necessary for the execution of the designated sequence cycle while he makes reference to a grinding mode-necessary parameter listing. For this reason, the parameter inputting to the numerical controller is time consuming, and error may be involved in choosing the control parameters, thus resulting in the wrong operation of the grinding machine.

Further, in conventional grinding, it is often the case that the change in workpieces or workpiece surfaces to be ground does not necessarily require changing respective feed rates in rough, fine and finish grinding steps, the number of spark-out times and the like. Particularly, it is a practice that a number of surfaces of a cylindrical workpiece are machined at a preliminary turning process to thereby have almost the same grinding allowances as one another. For the purpose of making the preparation of numerical control programs easy, it is therefore desired to use a common or standard set of control parameters as the data necessary for the numerical control grinding of a number of workpieces or workpiece surfaces.

Additionally, in the case of a workpiece having a number of axially spaced cylindrical surfaces to be ground under numerical control, reference index positions of a traverse table are programmed in relation respectively to the workpiece surfaces, and the traverse table movement during the grinding of each of the workpiece surfaces is controlled to be within an appropriate distance starting from one of the reference index positions which is programmed in relation to the workpiece surface being ground. However, if there exists a machining error in the depth of the workpiece center hole into which a work head center is inserted, the respective positionings of the traverse table to the reference index positions under numerical control do not cause the workpiece surfaces to be presented respectively to those positions each of which has a suitable positional relation to a grinding wheel, and therefore, precise grinding of the workpiece surfaces cannot be accomplished. Particularly, when one or both ends of a workpiece surface adjoin shoulder portions of adjacent workpiece surfaces, there may be effected an interference between the grinding wheel and the shoulder portions, which results in the breakage of the grinding wheel as well as in the damage of the workpiece. This problem can be solved by compensating the reference index positions for the machining error in the depth of the workpiece center hole. However, since for the advantage of using any present table index position as a command table index position, the reference index positions are practically programmed in the form of respective absolute values, such compensation must be carried out with respect to all of the programmed reference index positions, and a great deal of time is spent for such compensation. Accordingly, the necessity of making it possible to carry out such compensation within a short period of time has now been encountered.

SUMMARY OF THE INVENTION

Accordingly, it is a principal object of the present invention to provide an improved numerical controller for a grinding machine which shares the programming job of numerical control information with the operator to thereby relieve him of a substantial part of the programming job. To achieve this object, a numerical controller according to the present invention is provided with a write-in request device for visibly displaying the kinds of a plurality of control parameters necessary for the grinding of a workpiece surface so as to thereby request the writing-in of the control parameters and a data write-in device manually operable for writing the control parameters whose kinds are displayed by the write-in request device. The numerical controller further includes a storage device having a number of parameter kind storage areas which correspond respectively to a number of grinding modes in any one of which the workpiece surface is ground. Each of the parameter kind storage areas stores the kinds of a plurality of control parameters necessary for grinding control in a corresponding one of the grinding modes. The numerical controller, when responding to grinding mode designation data, reads out the kinds of control parameters from one of the parameter kind storage areas which corresponds to a designated grinding mode and controls the write-in request device to visibly display the read-out kinds of the control parameters. Accordingly, the operator can know what kinds of control parameters the numerical controller is requesting and using the data write-in device, can input the control parameters as requested by the numerical controller. This relieves the operator of choosing the control parameters that are necessary for the grinding of a workpiece in the designated grinding mode and thus, can prevent the operator's mistake from being involved in control parameter selection.

the numerical controller further includes a control parameter storage device for storing the control parameters written by the write-in device and an operational sequence storage device storing a number of operational sequence programs corresponding respectively to the grinding modes. Upon receiving a grinding start instruction, the numerical controller reads out the control parameters and one of the operational sequence programs corresponding to the designated grinding mode and then, controls servomechanisms of a grinding machine in accordance with the read-out control parameters and the read-out one of the operational sequence programs, so that the grinding machine is numerically controlled to thereby grind the workpiece in the designated grinding mode.

Another specific object of the present invention is to provide an improved numerical controller of the character set forth above which is capable of reliably informing the operator about what kinds of control parameters the numerical controller is requesting. To this end, in another aspect of the present invention, the above-noted numerical controller is further improved in that the write-in request device is constructed by a plurality of pilot lamps which are provided in correspondence respectively to the kinds of the control parameters. The numerical controller in this aspect is arranged to illuminate one by one those the lamps which correspond respectively to the read-out kinds of the control parameters and to continue the illumination of each of these lamps until the operator completes the writing-in of the requested control parameter. Consequently, it is possible to prevent the operator from being thrown into confusion during the data writing job.

A further specific object of the present invention is to provide an improved numerical controller of the character set forth above which is capable of numerically controlling a grinding machine to successively grind a number of axially spaced surfaces of a cylindrical workpiece in accordance with various control parameters manually input in advance of the grinding of the workpiece and a number of operational sequence programs respectively prescribing the manners in which the grinding machine is to be operated for the respective grindings of the workpiece surfaces.

A still further specific object of the present invention is the provision of an improved numerical controller of the character set forth above which is capable of reducing in number the operator's data write-in manipulations by transferring standard control parameters stored in a standard parameter storage area to a desired one of data stack tables each for storing various control parameters necessary for the grinding of a workpiece surface.

An additional specific object of the present invention is the provision of an improved numerical controller for a grinding machine wherein all of the programmed reference index positions to which a traverse table is to be indexed respectively for the grindings of a number of axially spaced surfaces of a cylindrical workpiece can be automatically compensated for a machining error in the depth of the workpiece center hole by manually inputting a desired table index position suitable for grinding one of the workpiece surfaces.

BRIEF DESCRIPTION OF THE DRAWINGS

Various other objects, features and attendant advantages of the present invention will readily be appreciated as the same becomes better understood by reference to the following detailed description of a preferred embodiment when considered in connection with the accompanying drawings, wherein like reference numerals designate like or corresponding parts throughout the several views, and in which:

FIGS. 9A and 9B are a flow chart of a manual data input (MDI) routine executed by a central data processor shown in FIG. 1, particularly illustrating a data write-in request routine of the MDI routine;

FIG. 11 is an explanatory view of a lamp address table indicating address locations of write-in request lamps;

FIG. 12 is an explanatory view of an MDI table indicating the kinds of control parameters necessary for the grindings in respective grinding modes;

FIG. 13 is a flow chart of a standard parameter transfer routine executed by the central data processor;

FIG. 14 is a flow chart of a subroutine executed by the central data processor for the writing-in of a traverse table position;

FIG. 15 is a flow chart of a subroutine executed by the central data processor for the compensation of table index position data;

FIG. 16 is an operational cycle chart showing the grinding start operation of the grinding machine;

FIG. 17 is a sequence cycle table prescribing the sequence of subroutines to be executed by the central data processor in the grinding start operation;

FIG. 18 is an operational cycle chart showing the size control plunge grinding operation of the grinding machine;

FIG. 19 is a sequence cycle table prescribing the sequence of subroutines to be executed by the central data processor in the size control plunge grinding operation;

FIG. 20 is an operational cycle chart showing the table index operation of the grinding machine;

FIG. 21 is a sequence cycle table prescribing the sequence of subroutines to be executed by the central data processor in the table index operation;

FIG. 22 is an operational cycle chart showing the opposite-end infeed traverse grinding operation of the grinding machine;

FIGS. 23A and 23B are a sequence cycle table prescribing the sequence of subroutines to be executed by the central data processor in the opposite-end infeed traverse grinding operation;

DETAILED DESCRIPTION OF A PREFERRED EMBODIMENT

Figure 1:
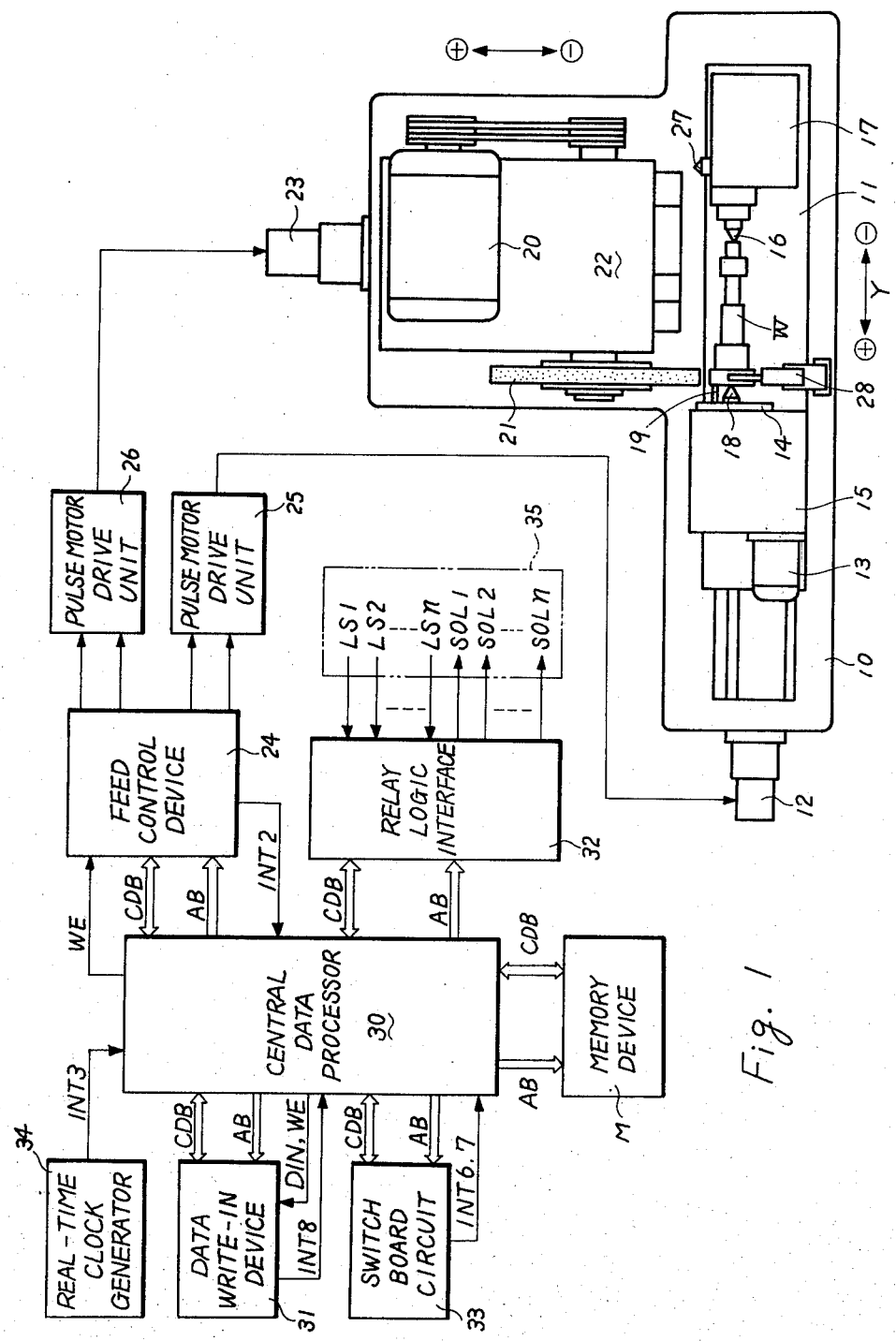
FIG. 1 is a block diagram of a numerical controller according to the present invention, also illustrating the schematic construction of a cylindrical grinding machine controllable thereby.

Referring now to the drawings and more particularly to FIG. 1 thereof, a grinding machine is illustrated having a bed 10, on which a traverse work table 11 is guided for sliding movement in a longitudinal Y-axis direction. A pulse motor 12 is mounted on one side of the bed 10 for displacing the table 11 in the Y-axis direction. The table 11 mounts thereon a work head 15 which carries a work spindle 14 rotatable by a motor 13 and also mounts thereon a foot stock 17 carrying a foot stock center 16. The work spindle 14 is provided with a work center 18 and a drive pin 19. A cylindrical workpiece W of a multi-stepped shape is supported between the centers 16 and 18 and is engaged with the drive pin 19 for being rotated thereby.

A wheel head 22 carrying a grinding wheel 21 rotated by a wheel drive motor 20 is also guided on the bed 10 for sliding movement in an X-axis direction transversal to the axis of the workpiece W and is in a driven connection to a pulse motor 23 mounted on a rear side of the bed 10 as well as to a hydraulic actuator (not shown) so as to be displaced thereby respectively at a desired infeed rate and a predetermined rapid feed rate. The pulse motors 12 and 23 are connected respectively to pulse motor drive units 25 and 26 and, when feed pulses are supplied from a feed control device 24 to the drive units 25 and 26, respectively displace the table 11 and the wheel head 22 in response to the feed pulses supplied thereto. Thus, the relative movement between the wheel head 22 and the table 11 is effected whereby the grinding of the workpiece W is performed. Further, a dressing tool 27 is protruded from the foot stock 17 toward the wheel head 22 and serves to dress the grinding wheel 21 by changing the relative movement between the wheel head 22 and the table 11. In position on the bed 10 opposed to the grinding wheel 21 through the workpiece W, there is mounted a sizing device 28, which is adapted to be moved by a hydraulic actuator (not shown) to and away from the workpiece W for engagement therewith at its advanced position. The sizing device 28 is also adapted to measure the diameter of the workpiece W with the result of emitting a number of sizing signals when the workpiece N is ground to respective predetermined sizes. In this particular embodiment, the sizing device 28 is of the type that emits a first sizing signal AS1 when the workpiece W is ground to a rough grinding completion size and further emits second and third sizing signals AS2 and AS3 respectively when the workpiece W is ground to a fine grinding completion size and a final finish size.

Yet in FIG. 1, there is illustrated a central data processor 30, which together with the feed control device 24 and a data write-in device 31, constitutes a numerical controller. The processor 30 is constructed by a small digital data processing device such as a so-called "microcomputer" and is connected to a memory device M through a 16-bit address bus AB and a 16-bit central data bus CDB. The central data processor 30 is further connected through the buses AB and CDB to the feed control device 24, the data write-in device 31 as well as to a relay logic interface circuit 32 for auxiliary function control and an operator switch board circuit 33. The interface circuit 32 serves to exchange diverse signals between itself and an auxiliary controller 35, which controls diverse logic sequence functions of the grinding machine. As will be described later in detail, the switch board circuit 33 is provided with a manually operated pulse generator for feeding the wheel head 22 and the table 11 in a manual mode and various control switches for manually controlling the logic sequence functions.

Figure 2:
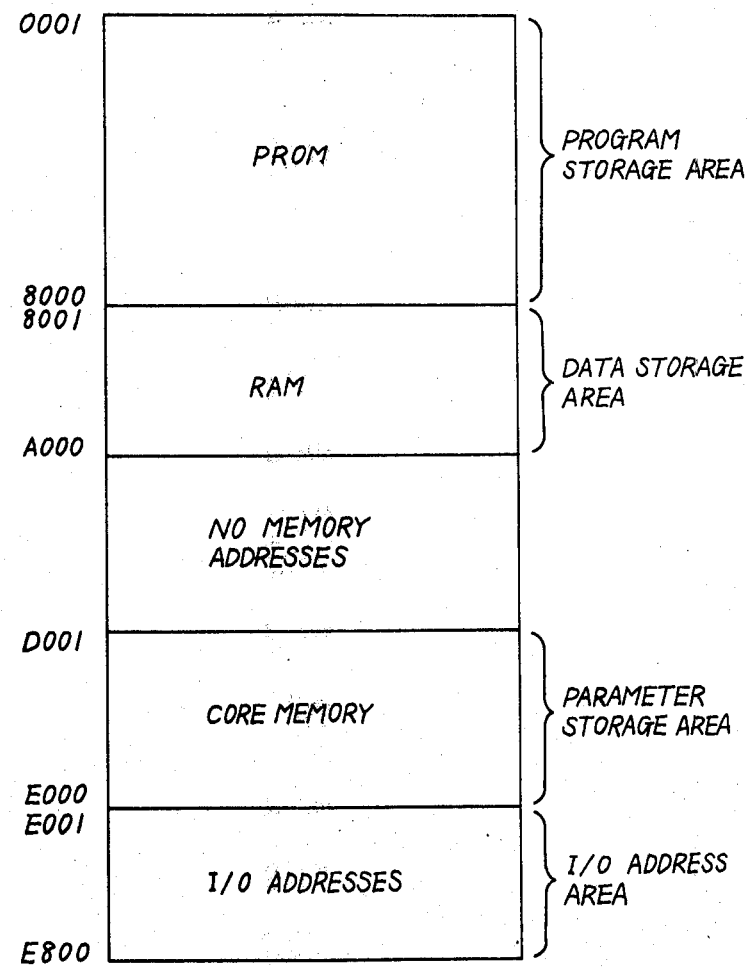
FIG. 2 is an address map showing address allocation to memory devices and input and output devices.

FIG. 2 shows an address map of the central data processor 30. Address numbers 0 to E000 (hexadecimal notation) are assigned to addresses of the memory device M, and address numbers E001 to E800 are assigned for address designation of the external input and output devices. A memory area designated by address numbers 1 to E000 is roughly grouped into a program storage area, a data storage area and a parameter storage area.

The program storage area in which no data rewriting is necessary is constructed by a nonvolatile semiconductor memory generally known as "PROM" and stores a control program executed in grinding a workpiece or workpiece surface in a designated one of a number of grinding modes, a manual data input (MDI) program executed in writing various control data by means of the data write-in device 31 and other control programs. The data storage area, constructed by a volatile semiconductor memory generally known as "RAM", is provided for storing diverse temporal data. The parameter storage area in which data rewriting is necessary is constructed of a core memory and serves to store various control parameters necessary for grinding a workpiece surface in a designated grinding mode.

Figures 3, 4:
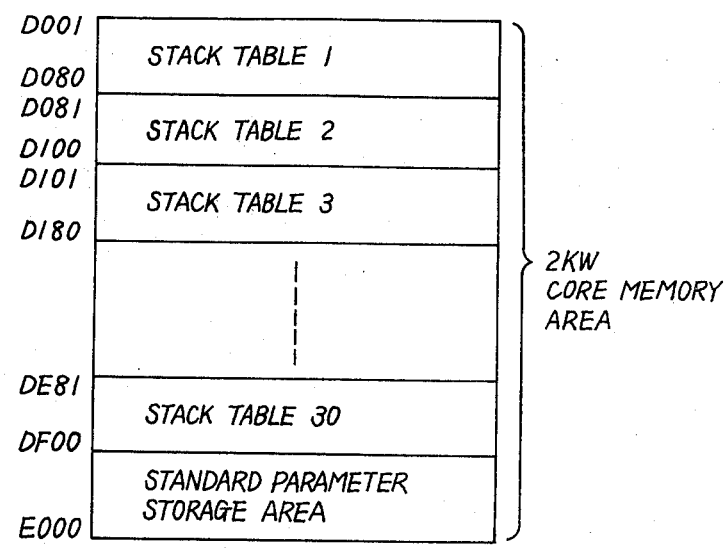
FIG. 3 is an explanatory view of a plurality of data stack tables and a standard parameter storage area provided in a core memory.
FIG. 4 is an explanatory view showing the detail of each data stack table.

As illustrated in FIG. 3, the parameter storage area constructed by the core memory provides thirty data stack tables, each of which is able to store a grinding mode and various control parameters necessary for grinding in the grinding mode. In this particular embodiment, data necessary for the grindings of three kinds of stepped shape cylindrical workpieces is storable in the data stack tables, and up-to ten grinding modes (some of which are different in kind from one another) and control parameters necessary for control in these modes are storable for one workpiece. It will therefore be realized that there can be ground any cylindrical workpiece having a single surface to be ground or axially spaced surfaces to be ground whose number is however limited to not more than ten. The control program storage area also stores an automatic operation program, which is executed for automatically and successively grinding surfaces (not larger in number than ten) of any cylindrical workpiece. FIG. 4 shows the detail of each of the stack tables, which has a third address "2" for storage of a grinding mode and a plurality of addresses following the third storage address "2" for storage of various control parameters. Addresses "0" and "1" of each stack table act as control flags to which reference is made so as to ascertain whether the stack table concerned has stored various control parameters or not.

Figure 5:
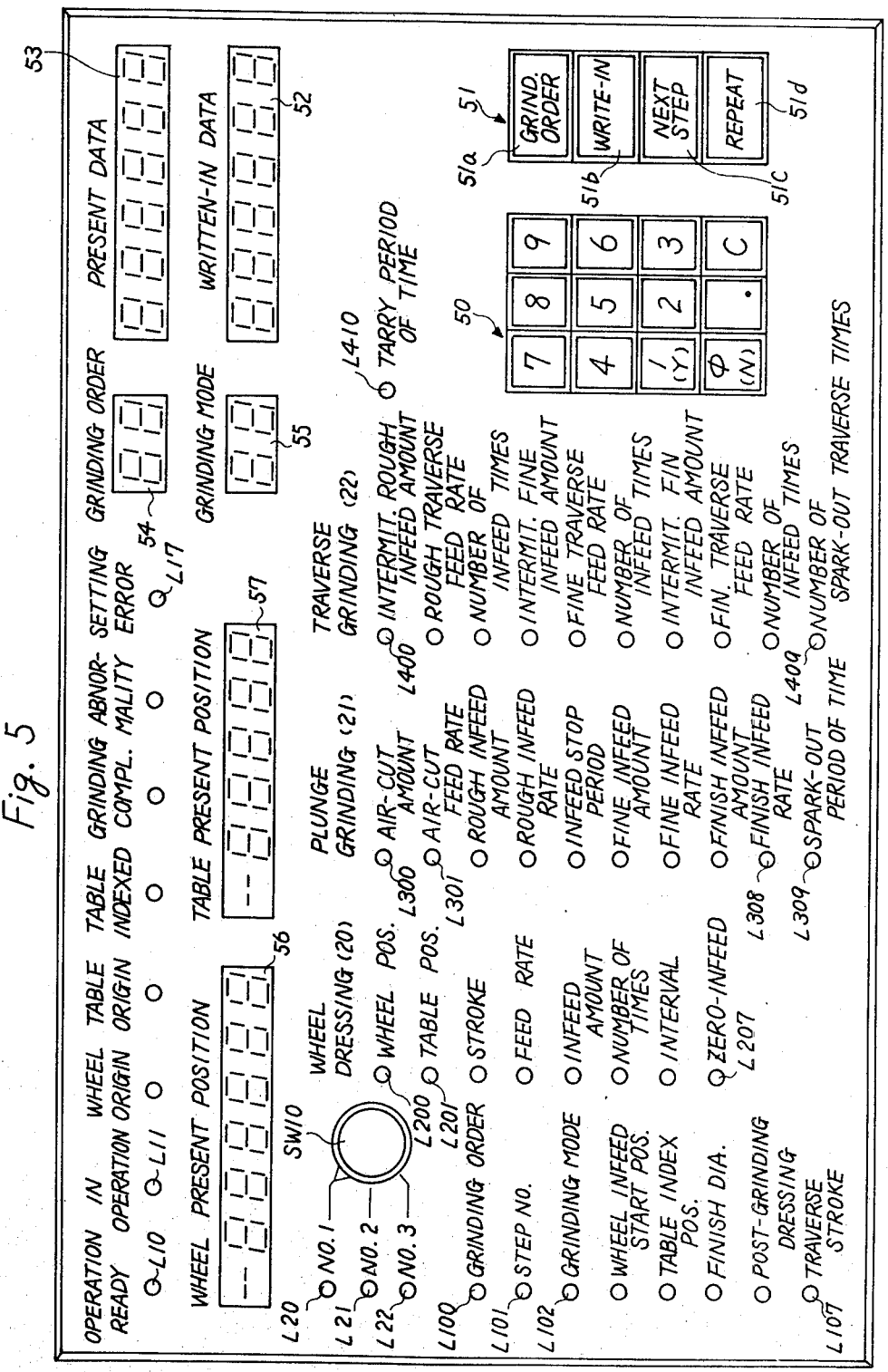
FIG. 5 is a plan view of a data write-in board constituting a data write-in device shown in FIG. 1.

The data write-in device 31 serves to write a grinding mode and various control parameters in any of the stack tables and includes a data write-in board as exemplified in FIG. 5. This board is provided thereon with respective sets of numeric and command keys 50 and 51 for writing grinding modes and various control parameters. Also provided on the board are a plurality of pilot lamps L100–L107, L200–L207, L300–L309 and L400–L410 such as radiating diodes, which enable the numerical controller to inform an operator of the kinds of various control parameters which are necessary for control in a written-in grinding mode. Opened on the data write-in board are six windows, which respectively fit therein numeric display units 52–57 each having a suitable number of digits. These display units 52–57 serve to display respective present positions of the wheel head 22 and the table 11 as well as to display any grinding mode, any control parameter and other data. A selector switch SW10 is further provided on the write-in board and is switchable to three positions No. 1 to No. 3 for designating one of three kinds of workpieces. Thus, by switching the switch SW10 to one of the switch positions, it is possible to write information or data necessary for grinding a certain workpiece in those of the stack tables assigned to the certain workpiece.

Figure 7A:
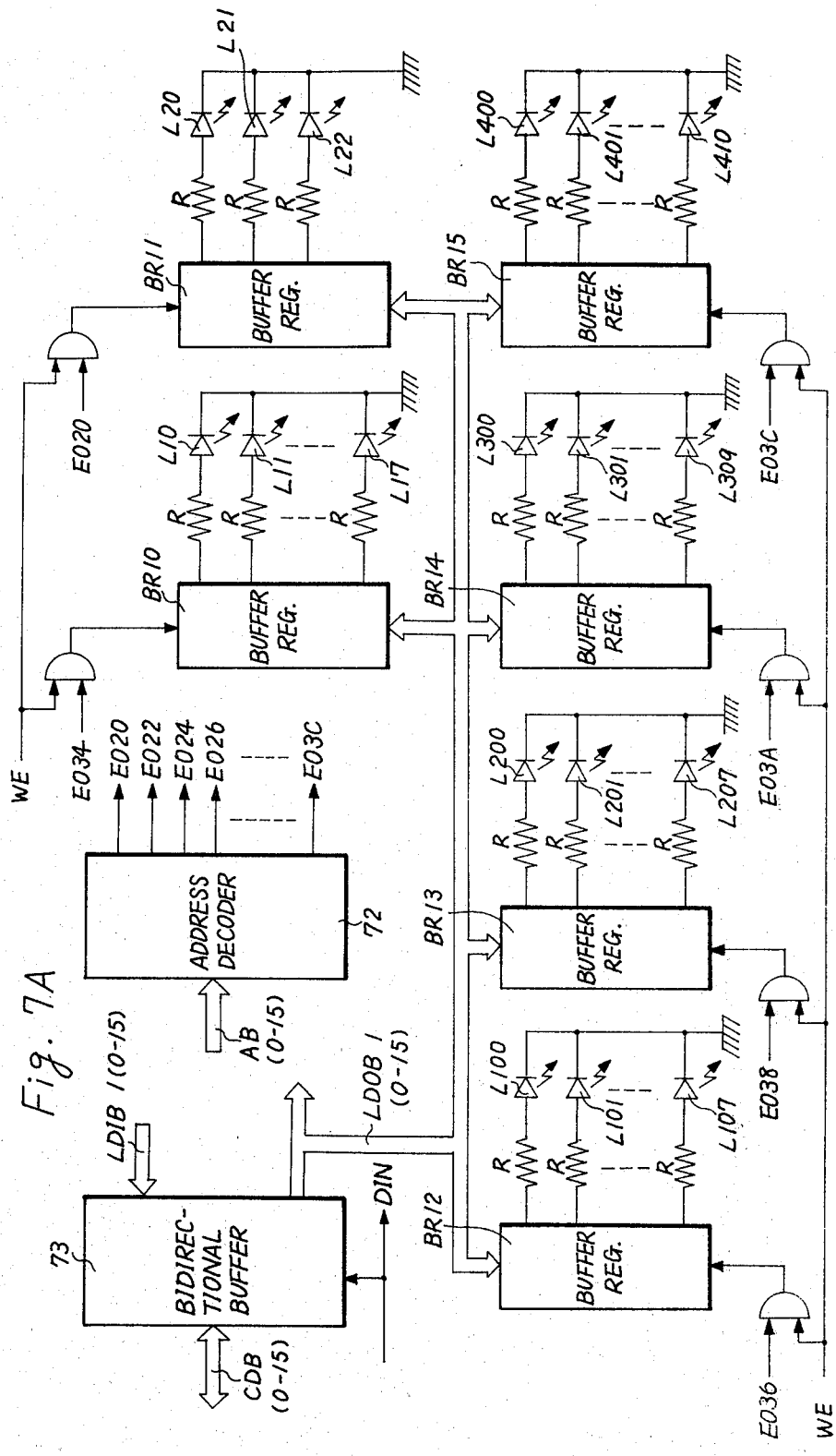
FIGS. 7A and 7B are a detailed block diagram of the data write-in device.
Figure 7B:
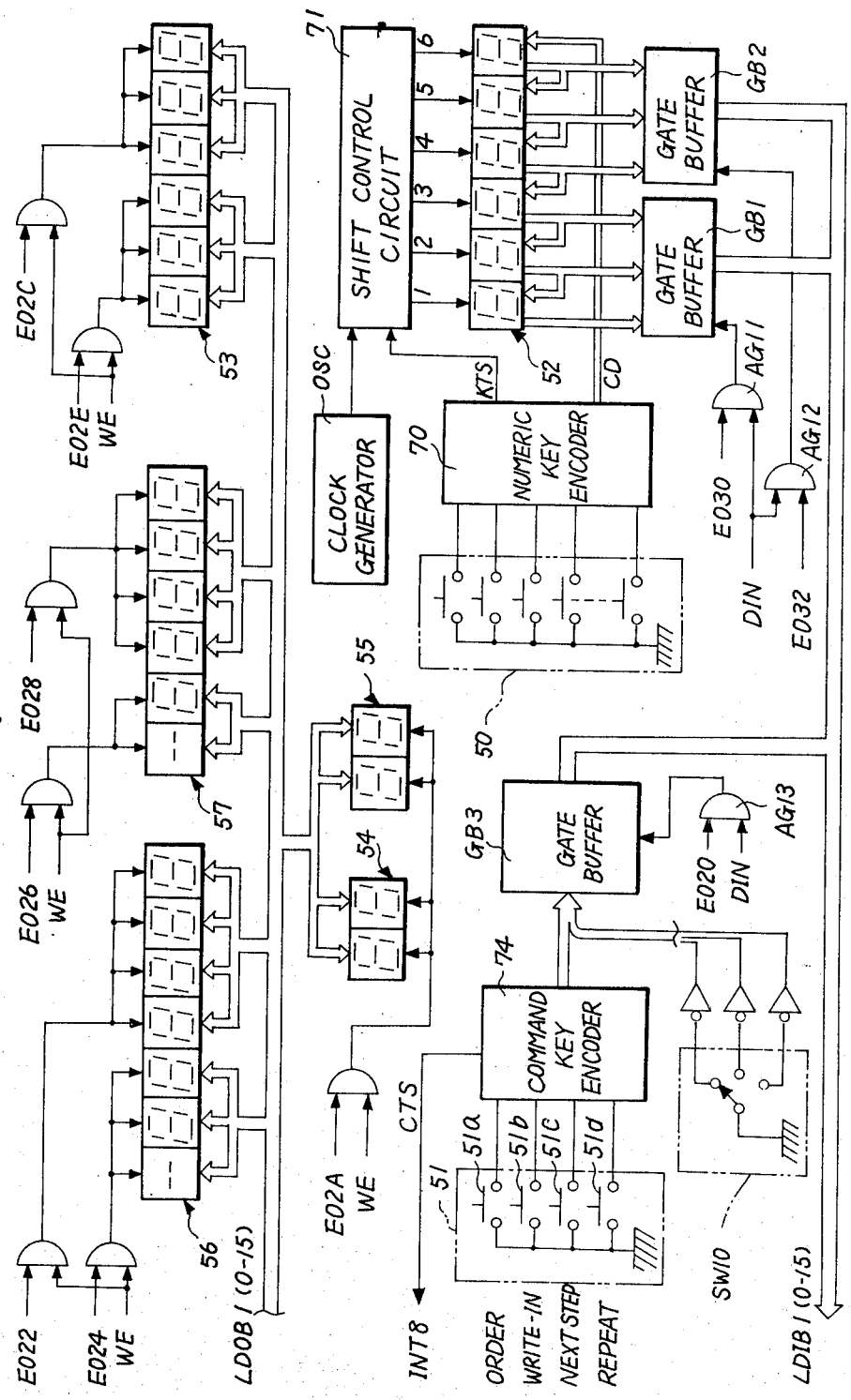

As illustrated in FIG. 7B, the set of the numeric keys 50 are connected to a numeric key encoder 70, which, each time any one of the numeric keys 50 is depressed, outputs coded data CD corresponding to the depressed key in addition to a trigger signal KTS. The numeric display unit 52 for displaying any key-in data is composed of six numeric displays, and one of these displays which displays the least significant digit numeral of the key-in data is connected at its 4-bit input terminal to the encoder 70 so as to receive therefrom the coded data CD. A shift control circuit 71 is connected to the encoder 70 so as to receive therefrom the trigger signal KTS. Each of the numeric displays constituting the display unit 52 includes a data latch circuit, a decode circuit, a drive circuit and a display element (not shown) and has a 4-bit output terminal for outputting latched data. The 4-bit output terminal of a less significant digit numeric display of the unit 52 is connected in series to a 4-bit input terminal of a more significant digit numeric display of the unit 52. Further, the output terminals of the six numeric displays are connected to a 16-bit local data input bus LDIBI through related gate buffers GB1 and GB2 to which input/output (I/O) addresses E030 and E032 are respectively assigned. The shift control circuit 71 is operable in a synchronism relation with pulses supplied from a clock generator OSC while receiving the trigger signal KTS, so as to output shift pulses one by one successively from output terminals 1–6 thereof. These output terminals 1–6 are connected respectively to latch signal input terminals (not numbered) of the six numeric displays of the unit 52 so as to input thereto the shift pulses. Thus, each time one of the numeric keys 50 is depressed, a numeral marked on the depressed key is displayed on the least significant digit numeric display of the unit 52, and any previously input numeral, if any, is shifted to the more significant digit numeric display, whereby all of data input by means of the numeric key 50 are displayed on the display unit 52. When the central processor 30 outputs address data respectively designating I/O address E030 and E032 in addition to a data input signal DIN, AND gates AG11 and AG12 are opened to in turn open the gate buffers GB1 and GB2. These address selection AND gates AG11 and AG12, together with other address selection AND gates shown in FIGS. 7A and 7B, are connected to an address decoder 72. This decoder 72 is responsive to address data supplied from the central processor 30 through the address bus AB so as to emit an address selection signal corresponding to the address data. The local data input bus LDIB1 is connected to a bidirectional buffer 73, which serves to couple the local data input bus LDIB1 with the central data bus CDB when receiving the data input signal DIN from the central processor 30. Accordingly, when the gate buffers GB1 and GB2 are opened, the central processor 30 is enabled to read the data being displayed on the display unit 52.

The set of the command keys 51 is composed of a grinding order command key 51a, a write-in command key 51b, a next step command key 51c and a repeat command key 51d, which are connected to a command key encoder 74. This encoder 74 outputs coded data, corresponding to the depression of one of the command keys 51, onto the local data input bus LBIB1 through a gate buffer GB3, which is opened when a decoded I/O address signal EO20 and the data input signal DIN are input to an AND gate AG13. The encoder 74 is arranged to output a trigger signal CTS as an interrupt signal INT8 to the central processor 30 when any one of the command keys 51 is depressed. The central processor 30 is responsive to the interrupt signal INT8 for executing the MDI program or routine as will be described hereinafter. The selector switch SW10 is connected to the gate buffer GB3 so as to input workpiece selection data to the central processor 30 through the gate buffer GB3.

I/O address numbers E02C, E02E, E02A, E022, E024, E026 and E028 are assigned to a present data display unit 53 composed of six numeric displays, a grinding order display unit 54 composed of two numeric displays, a grinding mode display unit 55 composed of two numeric displays, a wheel present position display unit 56 composed of one sign and six numeric displays, and a table present position display unit 57 composed of one sign and five numeric displays. A 4-bit input terminal of each of these numeric and sign displays is connected to the bidirectional buffer 73 through a 16-bit local data output bus LDOB1. The buffer 73 is also operable to couple the central data bus CDB with the local data output bus LDOB1 when not receiving the data input signal DIN from the central processor 30. Accordingly, when the central processor 30 outputs address data designating one of the display units 53–57 and a write enable signal WE in addition to numeric data to be displayed, one or two address selection AND gates connected to the designated display unit are opened, so that the numeric data appearing on the local data output bus LDOB1 is displayed on the designated display unit. Further, the pilot lamps L100–L107, L200–L207, L300–L309 and L400–L410 each for requesting the writing-in of a control parameter and other pilot lamps L10–L17 and L20–L22 for indicating operational status and the kinds of workpieces to be ground on the grinding machine are connected to related buffer registers BR12–BR15, BR10 and BR11, which respectively have I/O addresses E036, E038, E03A, E03C, E034 and E020. When the central processor 30 outputs address data designating one of the buffer registers BR10–BR15 in addition to the write enable signal WE, the address selection AND gate that is connected to one of the registers BR10–BR15 designated by the address data is opened to thereby enable the related buffer register to store the data appearing on the local data output bus LDOB1. The central processor 30, when outputting the address data, also outputs onto the central data bus CDB 16-bit lamp designation data, and thus, when this designation data is stored in the designated buffer register, one or more lamps of those connected to the designated buffer register are illuminated. For example, if the lamp L101 is to be illuminated, the 16-bit lamp designation data includes "1" only at its second bit. Also, if the lamps L101 and L107 are to be illuminated simultaneously, the 16-bit lamp designation data includes "1" only at its second and eighth bits.

Figure 6:
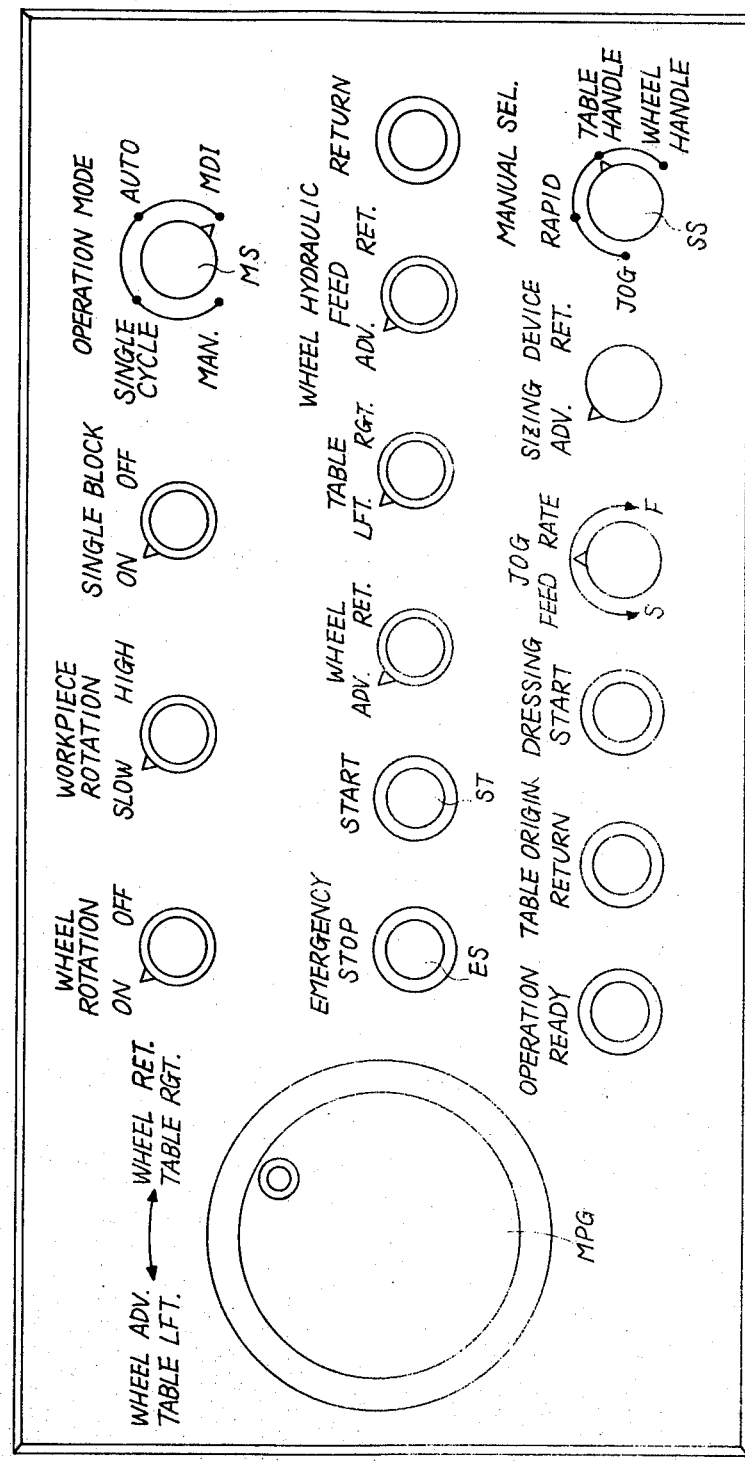
FIG. 6 is a plan view of a switch board constituting a switch board circuit shown in FIG. 1.

Referring now to FIG. 6, there is illustrated a switch board constituting the switch board circuit 33. This switch board is provided thereon with a plurality of control switches such as an operation mode selector switch MS, a start switch ST, an emergency stop switch ES and the like in addition to a manually operated pulse generator MPG. The switch positions of these switches are monitored in accordance with a base routine, not shown, that the central processor 30 executes in response to an interrupt signal INT3 which is generated at every 10-milliseconds from a real time clock generator 34 shown in FIG. 1. The central processor 30 is responsive to the interrupt signal INT8 emitted from the data write-in device 31 so as to execute the MDI routine, referred to later, when the operation mode selector switch MS is in an MDI position. The central processor 30 is enabled to operate in an automatic operation mode when the operation mode selector switch MS is in an AUTO position. When the manually operated pulse generator MPG is rotated after the switching of the operation mode selector switch MS to a MANUAL position and after the switching of a manual selector switch SS to either of a TABLE HANDLE position and a WHEEL HANDLE position, either interrupt pulse signals INT6 or interrupt pulse signals INT7 which are distinguished in dependence upon the rotational direction of the pulse generator MPG are applied to the central data processor 30, so that manual feed control is executed.

Figure 8:
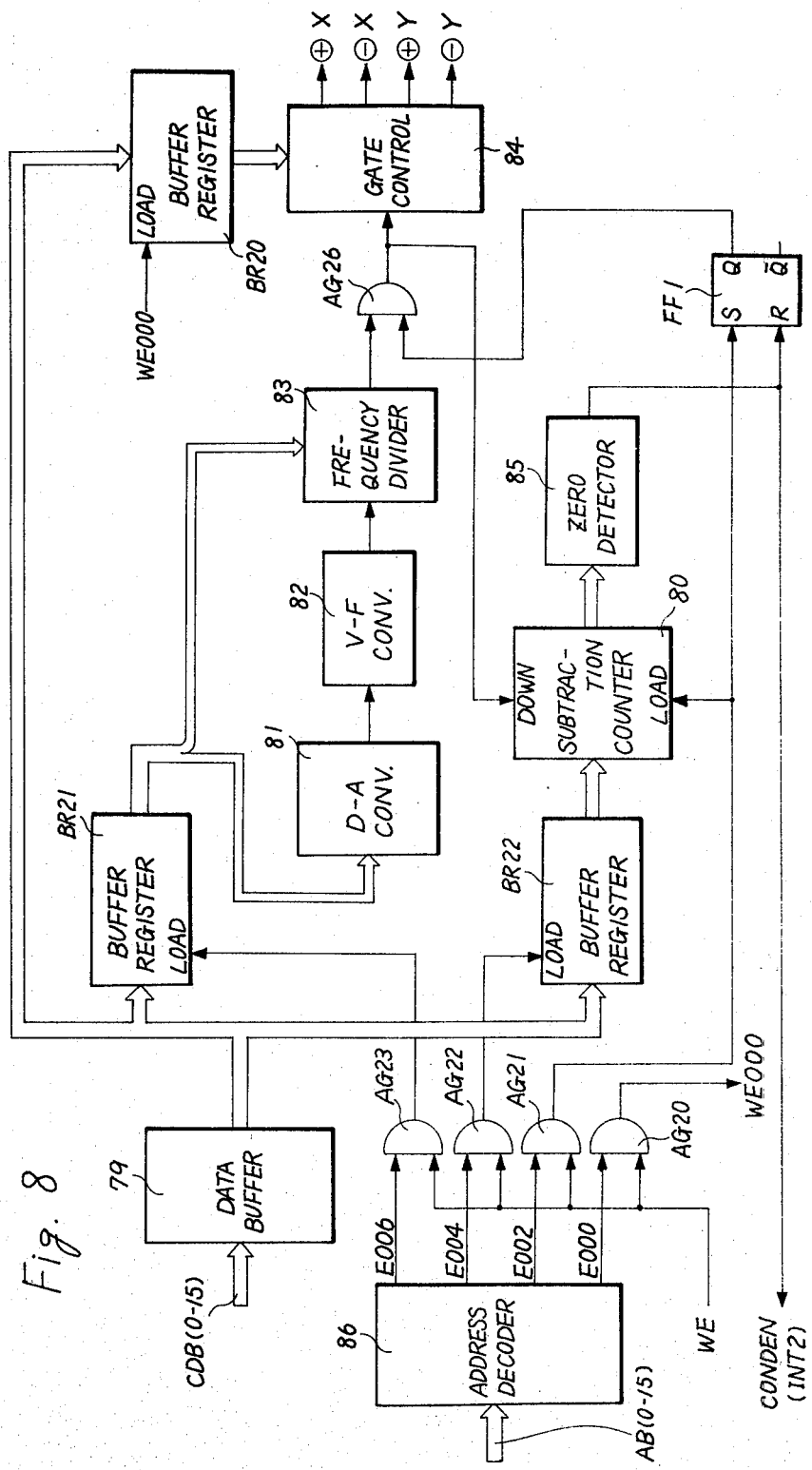
FIG. 8 is a detailed block diagram of a feed control device shown in FIG. 1.

The feed control device 24 shown in FIG. 1 serves to output to the pulse motor drive units 25 and 26 feed pulses whose number and frequency are designated by the central processor 30, in either of the AUTO mode of the MANUAL mode. Referring now to FIG. 8 illustrating the detail of the feed control device 24, there is provided a data buffer 79, which is connected to receive from the central processor 30 through the central data bus CDB axis and direction designation data, frequency designation and frequency dividing rate data, and feed amount data. Buffer registers BR20–BR22 having respective I/O addresses E000, E006 and E004 are connected to the data buffer 79 so as to respectively receive therefrom the axis and direction designation data, the frequency designation and frequency dividing rate data, and the feed amount data. An address decoder 86 is connected to receive address data from the central processor 30 through the address bus AB and acts to output decoded address signals E000, E002, E004 and E006 respectively to AND gates AG20–AG23. These AND gates AG20–AG23 are connected also to receive the write enable signal WE from the central processor 30 and, when opened, respectively output load signals to data load terminals LOAD of the buffer register BR20, a presettable subtraction counter 80 and the buffer registers BR22 and BR21.

Of the data stored in the buffer register BR21, the frequency designation data is applied to a D-A converter 81 so as to be converted into a corresponding analogue signal, which is in turn applied to a V-F (voltage to frequency) converter 82. Thus, pulse signals are generated from the V-F converter 82 at a designated frequency and are supplied to a frequency dividing circuit 83. This circuit 83 is responsive to the frequency dividing rate data stored in the buffer register BR21 so as to decrease the frequency of the pulses input from the V-F converter 82 to one-tenth or one-one hundredth of the designated frequency or to directly pass therethrough the pulses being generated at the designated frequency. The pulses output from the dividing circuit 83 are supplied through an AND gate AG26 to a gate control circuit 84 as well as to a subtraction terminal DOWN of the presettable subtraction counter 80. The gate control circuit 84 acts to selectively open a number of gates provided therein in response to the axis and direction designation data stored in the buffer register BR20, so that the pulses are supplied to any selected terminal, that is a positive feed pulse receiving terminal ⊕ or a negative feed pulse receiving terminal ⊖ of any selected pulse motor drive units 25 or 26. The function of the presettable subtraction counter 80 is to receive as a preset initial value the feed amount data input from the buffer register BR22 and to decrement the initial value each time it receives one pulse from the AND gate AG26. A zero detection circuit 85 is connected to receive the content of the counter 80 as an input thereto and when the counter content is reduced to zero, emits a distribution completion signal CONDEN. This signal is supplied to a flip-flop FF1 to reset the same and is also supplied as an interrupt signal INT2 which requests data necessary for subsequent pulse distribution, to the central processor 30. The flip-flop FF1, when reset, discontinues the application of a set output signal to the AND gate AG26, which thus stops applying feed pulses to the gate control circuit 84 and the subtraction counter 80. The flip-flop FF1, when set upon receiving a signal from the AND gate AG21, applies the set output signal to the AND gate to thereby permit the same to pass the feed pulses.

The operation in control data write-in and automatic operation modes, of the numerical controller as constructed above will be described hereinafter with reference to flow charts.

In performing the writing-in of various control data, the operator first switches the operation mode selector switch MS provided on the switch board (FIG. 6) to the MDI position and then, switches the workpiece selector switch SW10 provided on the data write-in board (FIG. 5) to one of No 1, No. 2 and No. 3 positions in correspondence to a workpiece for which control data is to be written. Thereafter, using the numeric keys 50 and the command keys 51, he will input the control data to the numerical controller in the following manner.

(1) Writing-in of Grinding Order

Grinding order data is input to inform the central processor 30 concerning one of a number of surfaces to be ground of a workpiece for which the operator is performing data writing-in. If one surface is the surface to be ground in a first grinding step, the operator depresses the "1"-imprinted numeric key after depressing the grinding order command key 51a and then, depresses the write-in command key 51b. When data for a workpiece surface to be ground in a second or successive grinding step is to be input, the lamp L100 for grinding order is illuminated, in response to which the operator depresses one of numeric keys 50 which imprints a numeral corresponding to the second or successive grinding step and then, depresses the write-in command key 51b.

Figure 9A:
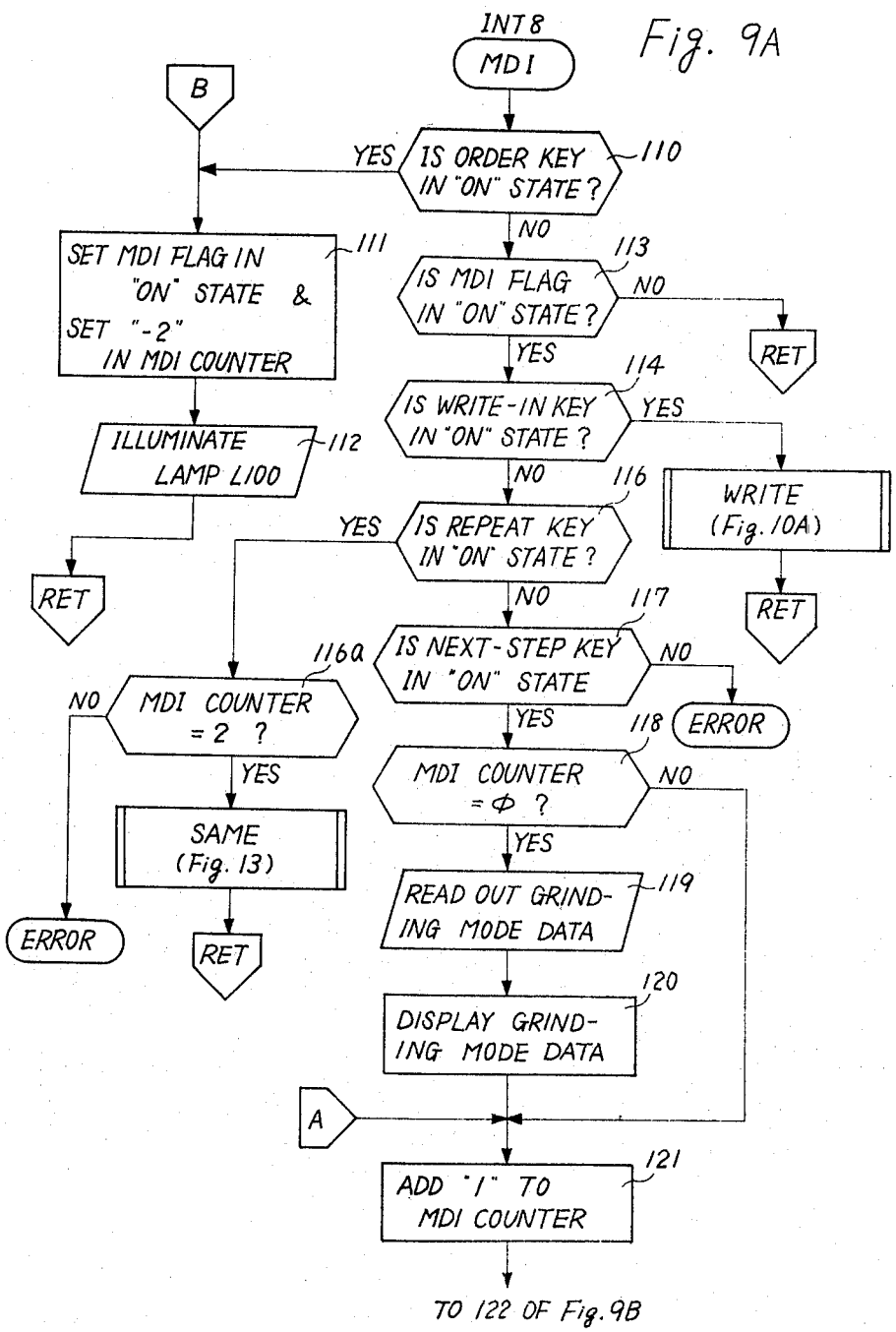

With the grinding order command key 51a depressed, a trigger signal CTS is emitted from the command key encoder 74 so as to be applied as the interrupt signal INT8 to the central processor 30, which is thus enabled to read out and execute an MDI routine shown in FIGS. 9A and 9B. In a first step 110 of the MDI routine, the processor 30 reads coded data output from the gate buffer GB3 so as to ascertain whether the depressed key is the grinding order command key 51a or not and if YES is answered, advances its routine to step 111 with the result of setting in "ON" state an MDI flag (not shown) provided in the RAM area 8001–A000 as well as of setting a value "−2" in an MDI counter (not shown) provided in the RAM area 8001–A000. It is to be noted herein that the MDI counter is provided for selectively designating a plurality of data write-in steps. For example, the MDI counter designates a grinding order input step as the step to be executed when storing a value "−2" and a grinding step number input step as the step to be executed when storing a value "−1". It is also to be noted that when storing a certain positive value, the MDI counter designates one row corresponding in number to the certain positive value, of a plurality of data rows of an MDI table (FIG. 12) provided in the PROM area of addresses 0001–8000, so as to request the writing-in of one of various control parameters necessary for control in a designated grinding mode. The routine of the central processor 30 is then advanced to step 112 so as to illuminate the grinding order lamp L100 by outputting, to the buffer register BR12 of address E036, 16-bit address data that carries "1" at its first bit and "0" at each of its other bits and then, is returned to the base routine.

When one of the numeric keys 50 is subsequently depressed, a numeral impressed on the depressed numeric key is displayed on the least significant digit numeric display of the write-in data display unit 52, so that the operator is able to visibly know the input grinding order. The subsequent depression of the write-in command key 51b by the operator causes the application of the interrupt signal INT8 to the central processor 30, which is thus enabled to execute the MDI routine again. The MDI flag is in the set state at this time, and this is recognized in step 113 thereby advancing the processor routine to step 114. This step 114 is a step to ascertain whether the depressed key is the write-in command key 51b or not. When it is ascertained that the write-in command key 51b has been depressed, a jump is made to a write-in routine WRITE shown in FIGS. 10A and 10B, in accordance with which a write-in processing is executed as follows:

In the first four steps 130–133 of this routine except for step 131a referred to later, the content of the MDI counter is checked to identify the data that has been input in accordance with the designation by the MDI counter, and in dependence upon the content of the MDI counter, a jump is made to any one of steps 134, 149, 151, 156 and 160. Since the MDI counter has indicated "−2" in this event, the processor routine is advanced to step 134, in which the data that has been displayed on the display unit 52 is read in a first temporal storage register (not shown) provided in the RAM area, and is further advanced to step 135, in which the workpiece number designated by the workpiece designation switch SW10 is read in a second temporal storage register (not shown) provided in the RAM area. Subsequently, in step 136, one of the stack tables in which a grinding mode and various control parameters are to be stored for the workpiece surface that the data stored in the first and second temporal storage registers designate is selected by making reference to the data stored in first and second temporal storage registers, and a first address number of the selected stack table is stored in a stack table address pointer (not shown and hereinafter called "STA pointer") provided in the RAM area. For example, assuming now that the designated workpiece number and the designated grinding order are respectively "1" and "1", the first one of the thirty stack tables shown in FIG. 3 is selected and the first address "D001" of the first stack table 1 is stored in the STA pointer. In a successive step 137, the grinding order stored in the first temporal storage register is displayed on the display unit 54.

It is ascertained in step 138 whether the value indicative of the grinding order is within the range of 1 to 10 or not, and the processor routine is advanced to step 139 if YES is answered or to step 145 if YES is not answered. In this event, since the designated grinding order is "1", the processor routine is advanced to step 139, wherein the same value as stored in the STA pointer is preset in a third temporal storage register (not shown) provided in the RAM area, and a value "2" is added to the third temporal storage register so as to indicate a third address of the selected stack table. It is further ascertained in step 140 whether the first temporal storage register has stored the grinding order "1" or not, and if YES is answered, the MDI counter is adjusted to indicate "−1" in step 141. In step 142, the number of stack tables storing various control parameters which were used in relation to one or more previously ground workpieces of a different kind designated as workpiece No. 1 by the selector switch SW10 and each storing a logical value "1" at its second address or row is counted and is displayed as data indicative of a grinding step number. Before returning to the base routine, the processor routine is then advanced to step 143, in which the lamp L101 is illuminated for requesting the writing-in of a grinding step number.

(2) Writing-in of Grinding Step Number

The operator inputs data indicative of the number of surfaces to be ground of the designated workpiece in response to the illumination of the lamp L101. Assuming now that the workpiece designated by the selector switch SW10 has three surfaces to be ground, it is necessary for him to depress the 3-imprinted numeric key and then, to depress the write-in command key 51b. The depression of the write-in command key 51b causes the central processor 30 to advance its routine to the write-in routine WRITE through steps 110, 113 and 114 of the MDI routine. Since the MDI counter has been set to indicate "−1", the processor routine is advanced to step 149, in which the central processor 30 displays the designated number of grinding steps on the display unit 53 and writes a logical value "1" in the second address of each of stack tables that are assigned respectively to the workpiece surfaces to be ground. In this case, since the workpiece number and the number of the workpiece surfaces to be ground are respectively "1" and "3", the logical value "1" is stored at the second address of each of the first three of the stack tables. The central processor 30 also clears all of the addresses which follow the second address of each of these first three stack tables so as to prepare for the writings-in of a grinding mode and control parameters and returns its routine to the base routine after setting "0" in the MDI counter in step 150.

(3) Writing-in of Grinding Mode

It is to be noted first that in this invention, the writings-in of grinding modes and various control parameters are successively executed in accordance with the directions given by the central processor 30. The depression by the operator of the next command key 51c causes the illumination of one of the pilot lamps L100–L107, L200–L207, L300–L309 and L400–L410 provided on the data write-in board, and the operator performs the writing-in of the data designated by the illuminated lamp. In order to make the execution of such control possible, the PROM area of the memory device M has stored therein a lamp address table as shown in FIG. 11 which indicates bit positions of I/O addresses to which the lamps associated with various control parameters are connected respectively and stack table addresses in which data input as the various control parameters are to be stored respectively. The PROM area has also stored therein an MDI table wherein as shown in FIG. 12, the kinds of various control parameters necessary for control in each of the grinding modes are indicated in the form of row numbers of the lamp address table. In this MDI table, the first four rows are provided for any workpiece surface which is to be ground in a first grinding step and in any one of the grinding modes, while the second four rows are provided for any workpiece surface which is to be ground in a successive grinding step and in any one of the grinding modes. The successive three rows of the MDI table are provided for use in setting various standard parameters necessary respectively for dressing, plunge grinding and traverse grinding. It is noted herein that only the lamp address table shown in FIG. 11 is used in the writing-in of any of the grinding modes.

When the next step command key 51c is depressed, this is detected in step 117 of the MDI routine by the central processor 30, which thus advances its routine to step 118 so as to ascertain whether the MDI counter has indicated zero or not. If zero has not been indicated, the processor routine is advanced directly to step 121. If zero has been indicated, data indicative of a grinding mode and being stored in the stack table selected in step 136 is read out in step 119 and is displayed on the display unit 55 in step 120. At this time, zero is displayed because of the stack table having been cleared. Subsequently, the processor routine is advanced to step 121 so as to add "1" to the content of the MDI counter and then, to step 122 so as to ascertain whether the content of the MDI counter has reached "1" or not. The processor routine is advanced to step 129 if the MDI counter has indicated "1" and to step 123 if it has not indicated "1". In this stage of operation, the content of the MDI counter has reached "1", and thus, the processor routine is advanced to step 129, wherein a search is executed for the data being stored in address or row "0" of the lamp address table shown in FIG. 11. After step 129, step 126 is executed to read out stack table address data "2", lamp address data "E036", and lamp bit position data "2" from the searched row "0" of the lamp address table, and step 127 is then executed to output the lamp address and bit position data "E036" and "2" respectively onto the address bus AB and the central data bus CDB. The lamp L102 of the third bit position designated by the bit position data "2" is thus illuminated so as to instruct the operator to input grinding mode data. In response to the illumination of the lamp L102, the operator inputs the grinding mode data by the use of the numeric keys 50 and then, depresses the write-in command key 51b. In this particular embodiment, it is possible to designate eight kinds of grinding modes as shown in the above-noted TABLE 1, and one of these grinding modes which is suitable to a surface to be ground of any workpiece is designated. For example, if a size control plunge grinding mode is suitable to the workpiece surface to be ground in a first grinding step of the designated workpiece, the "1"-imprinted numeric key and the write-in command key 51b are depressed in succession.

Figure 10A:
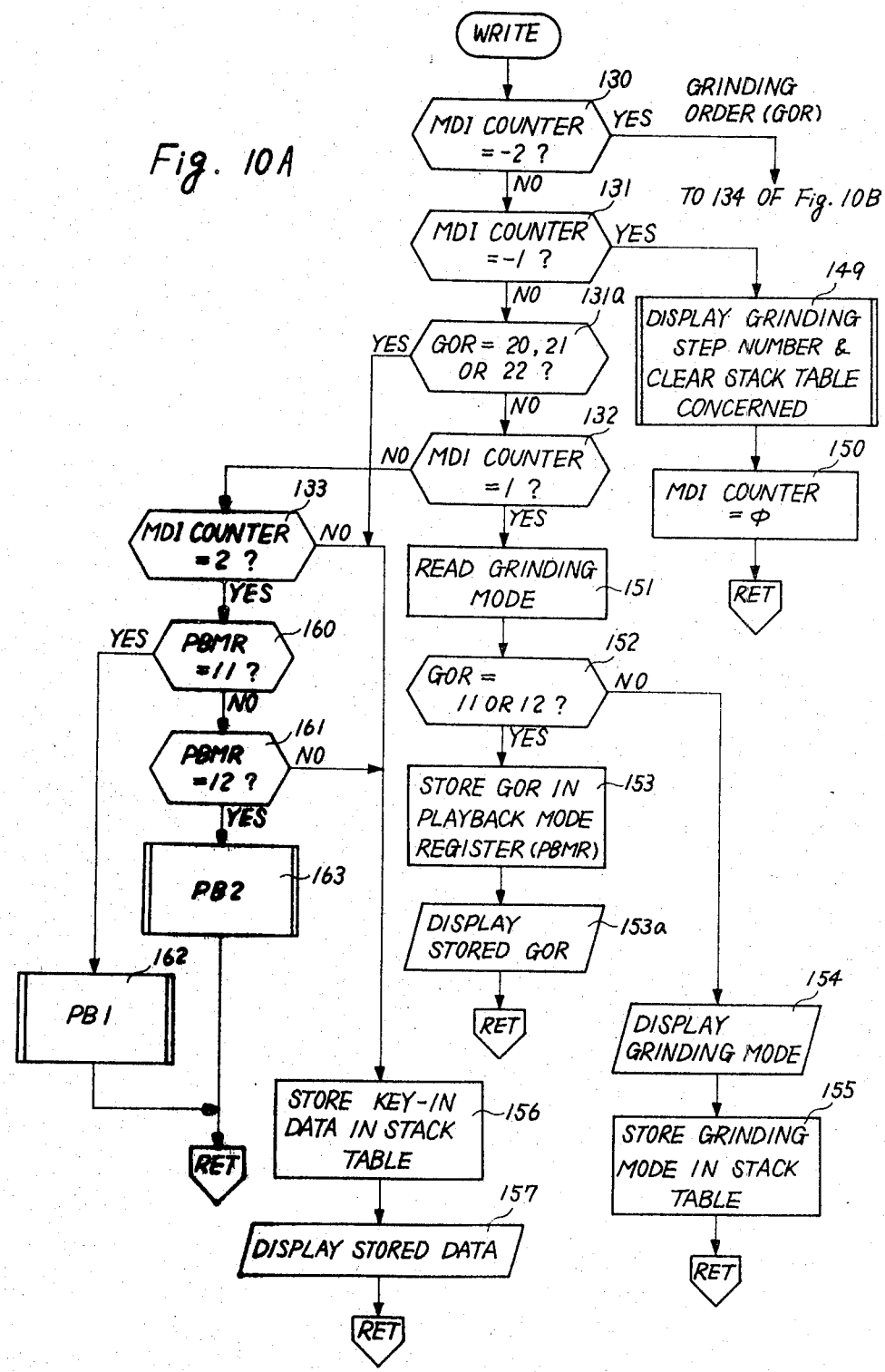
FIGS. 10A and 10B are a flow chart of a part of the MDI routine, particularly illustrating a data write-in routine.
Figure 10B:
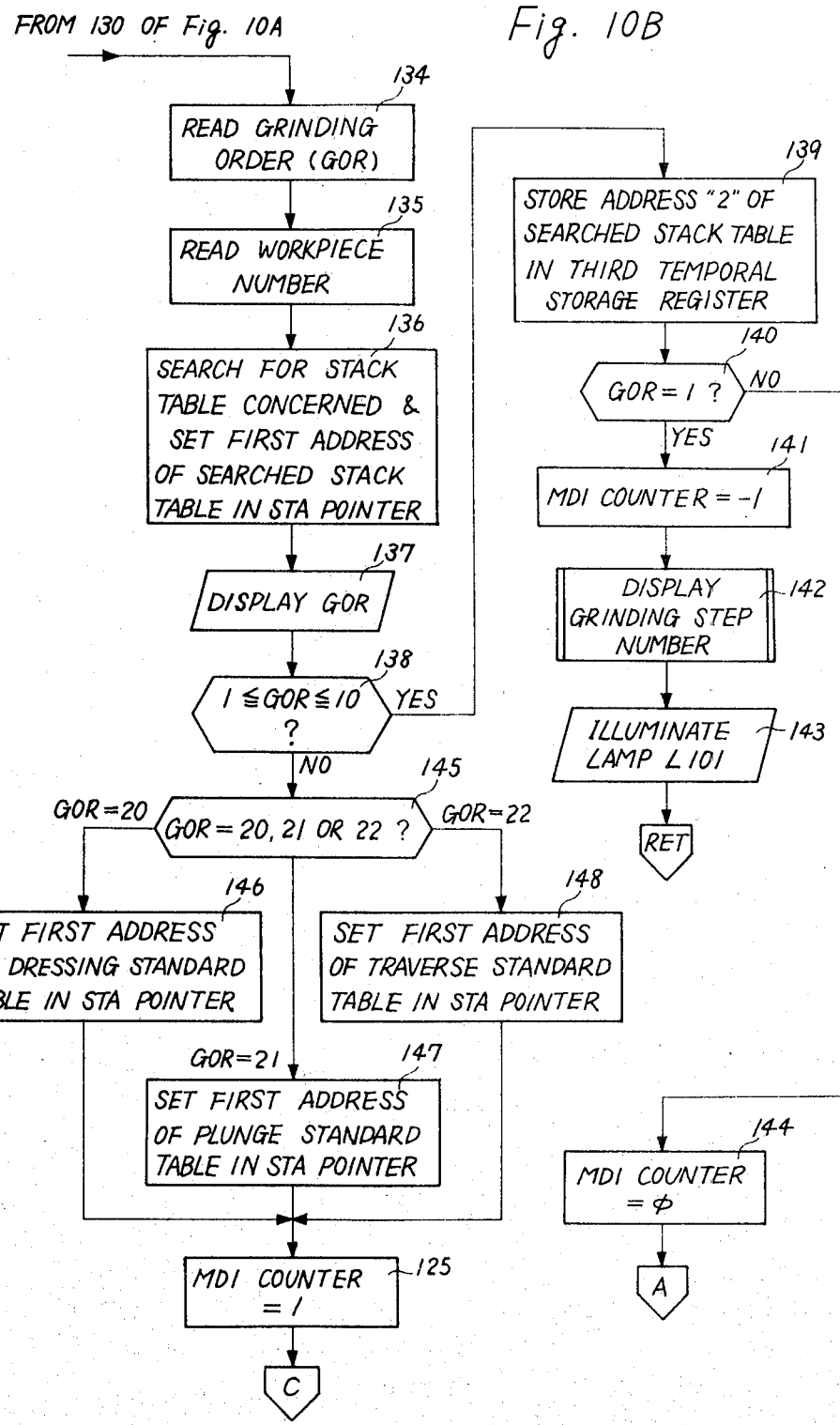

When the write-in command key 51b is depressed, such is detected in step 114 of the MDI routine, and thus, a jump is made to the write-in routine shown in FIGS. 10A and 10B, wherein it is ascertained in step 132 that the written-in data is the data indicative of a grinding mode, since the MDI counter indicates "1". Then, the central processor, in step 151, reads from the display unit 52 the grinding mode data having now been input by means of the numeric key 50 and in step 152, ascertains whether the data read in step 151 indicates "11" or "12". Since the read grinding mode data indicates "1" in this course of operation, the processor routine is advanced to step 154 so as to display the read grinding mode data on the display unit 55. In the subsequent step 155, the read grinding mode data is stored at the third address 2 of the selected stack table that is designated by the data stored in the third temporal storage register, and the processor routine is then returned to the base routine.

(4) Writing-in of Control Parameters

In the same manner as the writing-in of the grinding mode, the writing-in of any control parameter is initiated by depressing the next step command key 51c. The depression of the key 51c is detected in step 117 of the MDI routine, and since the MDI counter indicates "1", the processor routine is advanced from step 118 to step 121, wherein the MDI counter is incremented by one so as to indicate "2". Thereafter, step 122 is executed to ascertain whether the MDI counter indicates "1" or not. Since in this event, the MDI counter indicates "2", the processor routine is advanced to step 123, wherein by reference to the MDI table, one of the row numbers of the lamp address table is selected based upon the designated grinding mode and the count value of the MDI counter. In the subsequent step 124, it is ascertained whether or not the selected data indicates "−1" which means the end of data included in each of the rows of the MDI table, and if the selected data indicates "−1", the processor routine is jumped to the aforementioned step 111. On the other hand, if the selected data is not indicative of "−1", step 126 is then executed so as to read out stack table address data, lamp address data, and lamp bit position data from the row of the lamp address table that the selected data designates. Since at this time, the designated grinding mode data and the count value of the MDI counter respectively indicate "1" and "2", the execution of step 123 causes data indicative of "1" to be read out as the lamp address table row designation data from the MDI table shown in FIG. 12, whereby stack table address data "3", lamp address data "E036", and lamp bit position data "3" stored in the row number 1 (second row) of the lamp address table shown in FIG. 11 are read out in step 126. The central processor then executes step 127 so as to output to the buffer register BR12 (FIG. 7A) of address E036 data which carries a logical value "1" only at its fourth bit, and this effects the illumination of the lamp L103. Further, step 128 is executed, in which the various data that have been stored in a 3-byte area starting from address 3, of the selected stack table are read out and displayed on the display unit 53. In this stage of operation, zero is displayed since no data has been stored in the 3-byte area of the selected stack table.

The illumination of the lamp L103 informs the operator that data indicative of a wheel infeed start position is now requested as a control parameter to be next input, and therefore, he depresses the write-in command key 51b after inputting the wheel infeed start position data by means of the numeric keys 50. In this embodiment, the wheel infeed start position data is represented in the form of workpiece diameter data and is designated as a value which is obtained by doubling the distance between the workpiece rotational axis and the grinding surface of the grinding wheel 21 positioned at a rapid feed start position.

Since the depression of the write-in command key 51b is detected in step 114 of the MDI routine, a jump is made to the write-in routine WRITE. In the writing-in of any control parameter, the MDI counter indicates a value larger than "1", and thus, the processor routine is advanced from step 133 or step 161 to step 156, in which the data having now been displayed on the display unit 52 is stored in the stack table address that is designated by the sum of the content of the STA pointer and the stack table address data read out in step 126. At this stage of operation, the stack table address data "3" has been read out in step 126, the wheel infeed start position data is stored in storage address 3 (fourth address) of the stack table whose first address was preset in step 136 in the STA pointer. In a successive step 157, the data having just been stored in the stack table address designated by the STA pointer is read out and output of the present data display unit 53 so as to be displayed thereon. Since the data that the operator last input by means of the numeric keys 50 has still been displayed on the write-in data display unit 52, he is able to know an abnormality which might has occured on the data write-in device 31, the core memory constituting the stack tables or the like if a difference exists between two data displayed respectively on the present data display unit 53 and the write-in data display unit 52.

After the writing-in of the wheel infeed start position data is completed in the foregoing manner, the next step command key 51c is depressed again so as to execute the MDI routine. In step 121, the content of the MDI counter is incremented by one, and the lamp that indicates a control parameter to be next input is illuminated as a result of executing steps 123, 126 and 127. In this progress of operation, since the MDI counter is caused to indicate "3", data "2" stored in the third column of the first row of the MDI table is read out to select the third row (address 2) of the lamp address table. Lamp address data "E036", and lamp bit position data "4" stored in the selected third row are output from the central processor 30 so as to illuminate the lamp L104, by which the operator is informed of table index position data as a control parameter to be next input. Stack table address data "6" is also read out in step 126. In response to the illumination of the lamp L104, the operator inputs the table index position data by means of the numeric keys 50 and the write-in command key 51b. In this particular embodiment, in order that after indexing the traverse table 11 to a desired position by rotating the manual pulse generator MPG in the manual mode, the operator can directly input as table index position data the data that is displayed on the table present position display unit 57, data indicative of a reference index position to which the traverse table 11 is to be indexed in relation to the workpiece surface to be ground in the first grinding step is input, in this data writing-in, in the form of an absolute value counted from a fixed table original position.

As described hereinbefore, each time the operator pushes the next step command key 51c, the central processor 30 informs him of a control parameter to be next input by illuminating one of the parameter requesting pilot lamps provided on the data write-in board, and the operator then inputs the requested parameter by means of the numeric keys 50 and the write-in command key 51b. Accordingly, other control parameters are successively input in the same manner as described above. In the case where each of the grinding order and the grinding mode is designated as "1", after the necessity or unnecessity of a post-one surface grinding dressing is input by depressing either the "1"-imprinted numeric key or the "0"-imprinted numeric key and the write-in command key 51b in succession, the lamps L200 to L207 are successively illuminated so as to request that the operator input control parameters used for wheel dressing. Following this, the lamps L300-L308 are successively illuminated so as to request that the operator input various control parameters necessary for plunge grinding. In the case of the size control plunge grinding mode, it is often unnecessary to perform any spark-out grinding, and the lamp L309 for requesting the writing-in of a spark-out period of time is therefore not illuminated. Also in the case of the size control plunge grinding mode, an air gap grinding feed amount, a rough grinding feed amount and a fine grinding feed amount are not used to thereby directly control the feed movement of the wheel head 22, but they are used as data in calculating a rapid feed amount between a hydraulic rapid feed end position and an air gap grinding feed start position and as data in detecting the over-feeding of the wheel head 22.

As shown in FIG. 12, each row of the MDI table stores data "−1" indicative of end-of-writing at its used last column, for example, at column 23 in the case of grinding mode 1. Accordingly, when the writings-in of all of control parameters necessary for the selected grinding mode "1" are completed in the manner as described above, the end-of-writing indication data "−1" is read out in step 123 of the MDI routine executed thereafter, and thus, a jump is made from step 124 to step 111 so as to set a value "−2" in the MDI counter. The processor routine is then advanced to step 112 so as to illuminate the lamp L100 and is returned to the base routine. The illumination of lamps is displaced from the lamp L308 to the lamp L100 which requests the writing-in of grinding mode data, and the operator is thus informed that the writings-in of all the control parameters necessary for the workpiece surface to be ground in a first grinding step has been completed and that data indicative of a grinding order is to be next input.

(5) Writing-in of Data for Second or Successive Grinding Surface

The writings-in of a grinding mode and various control parameters necessary for the workpiece surface to be ground in a second or successive grinding step are carried out in the same manner as described above. In this writing-in, the operator inputs as the grinding order data one of numerals 2-10 which corresponds to the order of the workpiece surface to be ground, by means of the numeric keys 50 and then, depresses the write-in command key 51b.

Thus, the MDI routine is executed, from step 114 of which a jump is made to the write-in routine WRITE, wherein after switching the designation of stack tables, for example, from 1 to 2 (FIG. 3) in step 136, the control processor 30 advances its routine from step 140 to step 144 so as to adjust the count value of the MDI counter to zero. A jump is then effected to step 121 of the MDI routine, wherein the count value of the MDI counter is incremented by one to indicate "1", and the subsequent executions of steps 129, 126 and 127 cause the illumination of the lamp L102 for asking the operator to input grinding mode data. When the operator depresses the write-in command key 51b after inputting grinding mode data by means of the numeric keys 50, the newly input grinding mode data is displayed on the display unit 55 in step 154 and is stored in storage row 2 (third address) of the selected stack table of number 2. With the next step command key 51c depressed subsequently, the MDI routine is executed so as to search, in step 123, the MDI table and the lamp address table for a first one of various control parameters which are necessary to the newly designated grinding mode and so as to illuminate the lamp corresponding to the searched first control parameter in step 127. The operator inputs by means of the numeric keys 50 the control parameter that the illuminated lamp designates and then, depresses the write-in command key 51b with the result that the input control parameter is stored in one of storage addresses of the selected stack table which is designated at the selected row of the lamp address table. When the next step command key 51c is subsequently depressed, another data requesting lamp provided on the data write-in board is illuminated in the same manner as described above so as to indicate another control parameter to be next input.

Control parameters concerning grinding wheel dressing are commonly usable for a number of surfaces to be ground of a workpiece, and therefore, the MDI table shown in FIG. 12 is so prepared as not to ask for any control parameters which are necessary for the workpiece surface to be ground in a second or successive grinding step. More specifically, storage addresses of rows 6 to 13 of the lamp address table shown in FIG. 11 are provided for wheel dressing control parameters, and the MDI table shown in FIG. 12 stores the row numbers 6 to 13 in each of its rows provided for grinding order "1", but does not store the row numbers 6 to 13 in any of its rows provided for grinding orders "02" to "10". Taking now into consideration that the grinding mode in which a second grinding surface of the designated workpiece is to be ground has been designated to be an opposite-end infeed dead-stop traverse grinding mode of number 4, the eighth row of the MDI table is referred to in the data writing-in operation, and when the MDI counter advances its content from 6 to 7, the data stored in the eighth row changes from 5 to 24. Accordingly, the depression of the next step command key 51c after the writing-in of traverse stroke data requested by the lamp L107 causes the lamp L400 to be illuminated, thereby asking for the writings-in of various control parameters necessary for traverse grinding. These traverse grinding control parameters are successively input, and when the writing-in of tarry period-of-time data is completed, the grinding mode requesting lamp L100 is illuminated, whereby the operator can know the completion of the writings-in of all of the traverse grinding control parameters.

(6) Setting and Transferring of Standard Parameters

It is often the case that in conventional grinding, almost all of the control parameters can be used without being modified or changed even when the workpiece or the surface thereof to be ground is changed from one to another and that the grinding of a new workpiece or new surface can be executed after change is made with respect only to feed amount data of all of the previously input parameters. In the numerical controller according to the present invention, a part of the core memory is dedicated to serve as a storage area for storing diverse standard parameters which are necessary for grinding wheel dressing, plunge grinding, and traverse grinding, and there can be added a function to transfer, as a control parameter necessary for a particular workpiece surface, any of these standard parameters to any desired one of the stack tables. Therefore, in the numerical controller, the number of times through which control parameters are input for a particular workpiece or workpiece surface to be ground can be decreased, and this advantageously results in reducing the hand works that the operator performs for data input.

(6-a Setting of Standard Parameters

By means of the grinding order key 51a and the numeric keys 50, the operator inputs grinding order 20, 21 or 22 respectively when he wishes to write standard dressing parameters, standard plunge grinding parameters or standard traverse grinding parameters in the standard parameter storage area. When the write-in command key 51b is depressed following the inputting of one of the grinding orders 20 to 22, the MDI routine is initiated, from step 114 of which a jump is then made to the data write-in routine, wherein the input grinding order is identified through the executions of steps 134 to 138 and 145. The processor routine is then advanced, in dependence upon the result of such identification, to one of steps 146–148, wherein the STA pointer is set to indicate the first address of one of three standard parmeter stack tables into which the above-noted standard parameter storage area is divided for storing the standard dressing parameters, the standard plunge grinding parameters and the standard tranverse grinding parameters in a separate fashion. After setting the count value of the MDI counter to "1" in step 125, the central processor 30 advances its routine to step 123 of the MDI routine so as to search the MDI table for one of the row numbers of the lamp address table. For example, if grinding order "20" is designated, row number 35 of the lamp address table is read out, and the lamp that is identified by the lamp address and bit position data stored at the read-out row number 35 is illuminated in step 127 for requesting the writing-in of a corresponding standard parameters. When the operator then inputs the standard parameter, the processor routine is advanced by way of step 131a to step 156, in which the storing of the input standard parameter in one of the three standard parameter stack tables is executed in the same manner as the storings of the above-noted various control parameters in the stack tables. That is, a calculation is made for the sum of the stack table address data read out in step 126 and the content of the STA pointer, and the input standard parameter is then stored in the address designated by the sum, of one of the three standard parameter stack tables. Further, the writing-in of a successive standard parameter is initiated by the subsequent depression of the next step command key 51c and is executed in the manner as described above in connection with the writings-in of successive control parameters. Accordingly, the settings of various standard parameters concerning wheel dressing, plunge grinding or traverse grinding are executed by inputting one of grinding order data 20-22 and then, successively inputting the standard parameters that corresponding pilot lamps respectively designate.

(6-b) Transferring of Standard Parameters

For the purpose of using as control parameters the standard parameters, it is necessary to transfer the standard parameters from one of the standard parameter stack tables to a selected one of the control parameter stack tables. This is achieved by depressing the repeat command key 51d when the lamp L103 for requesting the writing-in of the wheel head infeed start position data is illuminated, in other words, after the next step command key 51c is depressed following the inputting of the grinding mode. The depression of the repeat command key 51d causes the initiation of the MDI routine and is detected in step 116 of this routine, whereby after step 116, a jump is made to a repeat processing rountine SAME shown in FIG. 13. This routine SAME includes step 170 of ascertaining whether the designated grinding order indicates "1" or not, and if the grinding order indicates "1", steps 173 to 175 are in turn executed so as to transfer the standard dressing parameters. The routine SAME further includes steps 171 and 172 of respectively ascertaining whether the designated grinding mode indicates "1" and "2" and, if NO is answered in step 171, whether the designated grinding mode is within the range of "3" to "8". The transferrings of the standard plunge grinding parameters are executed through steps 176–178 if YES is answered in step 171, and the transferrings of the standard traverse grinding parameters are executed through steps 180–182 if YES is answered in step 172. Each of a line of steps 173–175, a line of steps 176–178 and a line of steps 180–182 executes the same processings as one another. That is, in the first step of each line, a read-out address pointer (not shown) provided in the RAM area is set to indicate the first address of the standard parameter stack table concerned provided in the core memory area, and in the second step of each line, a write-in address pointer (not shown) provided in the RAM area is preset with the sum of predetermined address data and the address data is stored in the STA pointer in step 136. The predetermined address data is chosen as "16" in step 174 and as "33" in each of steps 177 and 181. In the last step of each line, one standard parameter is transferred from the first address of the standard parameter stack table concerned to the stack table address designated by the write-in address pointer. Although there is illustrated no detailed flow chart, this transferring of one standard parameter and the concurrent incrementations of the read-out and write-in pointer addresses are then repeated in the last step of each line, whereby once the routine SAME is executed, all of the standard parameters stored in any one of the standard dressing parameter stack table, the standard plunge grinding parameter stack table and the standard traverse grinding parameter stack table are successively transferred to the selected one of the control parameter stack tables.

(7) Playback of Traverse Table Position

The numerical controller is given a first playback function to store in a selected one of the stack tables the content of a register (not shown) which is provided in the RAM area for always storing a present index position of the traverse table 11. The controller is further given a second playback function to calculate the difference between a programmed position to which the traverse table 11 is indexed in accordance with numerical control data prior to the grinding of a certain surface to be ground in a first step, of a workpiece and a desired position to which the traverse table 11 is to be indexed prior to such grinding and then, to compensate the respective indx positions, to which the traverse table 11 is indexed in accordance with numerical control data prior to the grindings of other surfaces of the workpiece, for the difference between the programmed and desired index positions. Using the first playback function, the operator is able to input as a control parameter the content of the present index position register after indexing the traverse table 11 to a desired index position in the manual mode and therefore, is relieved of calculating respective table index positions for surfaces to be ground of any workpiece from a part drawing. Further, using the second playback function, it is possible to compensate at a time the axial positions of all the surfaces of a workpiece for the difference between actual and designed depths in a work head side center hole of the workpiece.

The first and second playback functions are initiated by respectively inputting data "11" and "12" in the step of inputting a grinding mode. The data "11" or "12", when input, is detected in step 152 of the write-in routine WRITE and in step 153, is stored in a playback mode register PBMR (not shown) provided in the RAM area before return is made to the base routine through step 153a in which the input data "11" or "12" is displayed. The subsequent depression of the next step command key 51c causes the MDI counter to increment its content to "2" in step 121 of the MDI routine. The MDI table and the lamp address table are then searched in steps 123 for the lamp L104, which is thus illuminated to inform the operator that table index position data is to be next input. When he depresses the write-in command key 51b in response to the illumination of the lamp L104, the processor routine is advanced through steps 110, 113 and 114 of the MDI routine and steps 130-133 of the write-in routine WRITE to steps 160 and 161, in which it is ascertained whether the playback mode register PBMR has indicated "11" or "12". The processor routine, if the register has indicated "11", is advanced to step 162 so as to execute a first playback routine PB1 shown in detail in FIG. 14 and, if it has indicated "12", is advanced to step 163 so as to execute a second playback routine PB2 shown in detail in FIG. 15.

Referring now to FIG. 14, the first playback routine PB1 is started from step 190, in which the write-in address pointer is adjusted to indicate the address "6" that, for storing table index position data, is assigned within one of the stack tables associated with a selected workpiece surface. The routine PB1 continues to step 191 so as to store in the pointer-indicated address the data that is stored in the present table index position register and then, returns the processor routine to the base routine. Referring then to FIG. 15, the second playback routine PB2 is started from step 193, wherein it is ascertained whether the stack table selected in step 136 has stored grinding order data "1" or not. If YES is answered, steps 194 to 196 are in turn executed so as to calculate the difference between a present table position stored in the position register and a programmed table position that has been stored in the selected stack table in connection with the surface to be first ground of a workpiece. The successive step 197 is then executed so that the programmed table position data stored in the selected stack table is revised based upon the calculated difference. It is then ascertained in step 198 whether or not table index position data has been stored in a successive one of the stack tables assigned to the workpiece that the workpiece selector switch SW10 has designated, in other words, whether such revision has been completed with respect to a surface to be last ground of the designated workpiece. The executions of steps 199 and 200 effect revising the table index position data stored in the successive one of the stack tables, based upon the calculated difference. The executions of these steps 198 to 200 are then repeated until table index position data stored in any of the stack tables assigned to the designated workpiece is revised, and return is then made to the base routine.

(8) Revision of Control Parameters

The revision of written control parameters is initiated by switching the workpiece selector switch SW10 in position to designate a workpiece with which the operator wishes to effect such revision and then, by depressing the grinding order key 51a. This key 51a, when depressed, causes the lamp L100 to be illuminated in step 112 of the MDI routine, and the operator then inputs data indicative of one surface of the workpiece with which revision is to be carried out, by means of the numeric keys 50. When the write-in command key 51b is then depressed, the processor routine is advanced to the write-in routine WRITE through steps 110, 113 and 114 of the MDI routine and further to step 140 through step 130 and steps 134 to 139. Steps 141 to 143 or steps 144 and 121 to 128 are in turn executed thereafter, whereby the lamp L101 or L102 is illuminated. If necessary, the next step command key 51c is then depressed through one or more times so that the lamp designating any previously written control parameter that the operator wishes to revise is illuminated. Since step 142 or 128 is executed, the control parameter to be revised that the illuminated lamp designates is displayed on the present data display unit 53 at the same time as the lamp illumination. Then, the operator inputs a new control parameter, to be substituted for the previously written control parameter, by means of the numeric keys 50 after confirming the difference between these two parameters and depresses the write-in command key 51b. The depression of the write-in command key 51b at this time causes the processor routine to advance to step 156 of the write-in routine, in which the new control parameter is stored at the address where the previously written parameter was stored before now. It will be realized accordingly that any one of previously written control parameters can be revised in the same manner as described above.

Automatic Grinding Operation

Description will be made hereinafter with respect to the automatic grinding operation which is executed based upon the control parameters written in the foregoing manner. In the PROM area of the memory device M, there are stored a plurality of sequence cycle tables, referred to later, which respectively define various operational sequence cycles used for grindings in the above-noted eight grinding modes, for table index and for grinding wheel dressing, and the numerical controller is also given a function to complete an appropriate combination of those selected from the various operational sequence cycles. Each of the various operational sequence cycles is composed of a number of basic operations such as, for example, hydraulically actuated wheel head forward movement, wheel head infeed movement, table rightward movement, sizing signal checking and the like, and a plurality of subroutines for respectively performing these basic operations are also stored in the PROM area. In each of the plurality of the sequence cycle tables, those selected from the plurality of the subroutines are designated in a predetermined order appropriate to one of the various operational sequence cycles that the cycle table defines. As typical operational sequence cycles performed in the automatic grinding modes, FIGS. 16, 18, 20 and 22 respectively show an automatic grinding start sequence cycle, a plunge grinding sequence cycle performed in grinding mode "1", a table index sequence cycle and an opposite-end infeed traverse grinding sequence cycle performed in grinding mode "4". FIGS. 17, 19, 21 and 23 (completed by FIGS. 23A and 23B) respectively shows sequence cycle tables which respectively define those operational sequence cycles shown in FIGS. 16, 18, 20 and 22. Each of the sequence cycle tables has stored at each line or row the number of a step to be next executed, in addition to the number of subroutine for performing one basic operation. Further, at each row which stores a subroutine for detecting the issuance of a sizing control signal, the number of times of traverse feed movements or the like, the numbers of steps to which jump is to be made respectively when a condition is satisfied and unsatisfied have been written respectively in the next step number column and the jump destination number column of the row. Although no illustration is provided, at each row of each sequence cycle table, there have been stored one or more fixed data used in executing a subroutine that the row designates. For example, if a subroutine designated at a row is for executing a feed movement, data indicative of memory addresses respectively storing a feed amount and a feed rate have been stored at the row. If a subroutine stored at a row is for energizing a solenoid, data indicative of an I/O address and a bit position thereof to which the solenoid to be energized is in connection have been stored as the data of the row.

Figure 24:
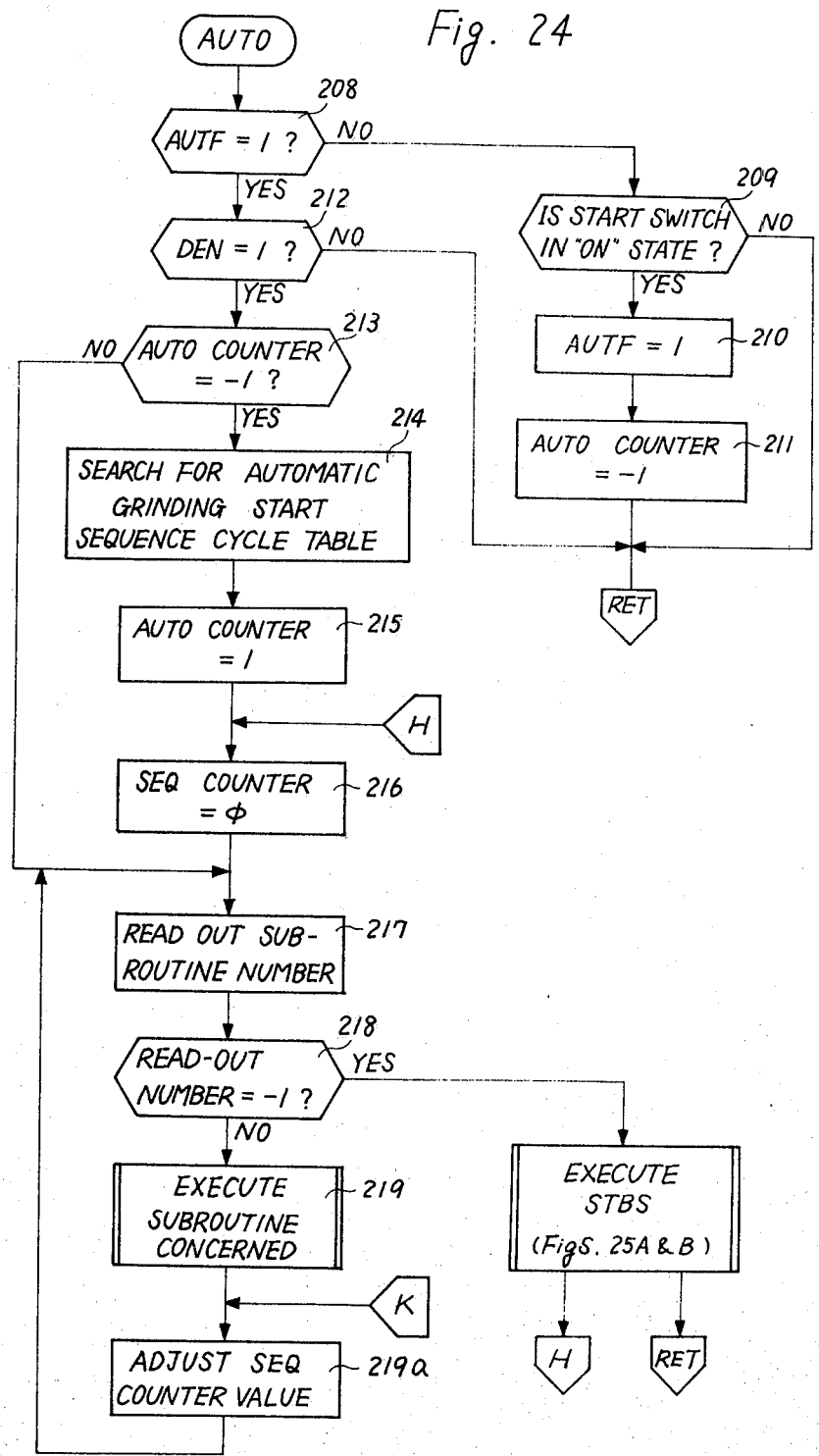
FIG. 24 is a flow chart of an automatic operation routine executed by the central data processor for automatic grinding control.

When the start push button switch ST is depressed after the switching of the mode selector switch MS to the AUTO position, the central processor 30 executes an automatic operation routine AUTO (hereinafter called "AUTO routine") shown in FIG. 24 in response to an interrupt signal INT3 which the real time clock generator 34 generates at every ten-millisecond intervals. In the execution of the AUTO routine, the central processor 30 completes an automatic grinding operation cycle for a designated workpiece surface by making an appropriate combination of those selected from the aforementioned various operational sequence cycles and, in accordance with the automatic grinding operation cycle, controls the grinding machine as follows:

The AUTO routine is started from step 208, wherein a test is effected to ascertain whether an automatic operation flag AUTF (not shown) provided in the RAM area is in the logical "1" state or not. If it is not in the logical "1" state, it is meant that the execution of the automatic operation has not yet been instructed, and therefore, it is ascertained in step 209 whether the start button switch ST has been depressed or not. If the switch ST has been depressed, the automatic operation flag AUTF is set to the logical "1" state in step 210, and an AUTO counter (not shown) provided in the RAM area is set to indicate "−1" before the returning of the processor routine to the base routine. Step 212 is for ascertaining whether a pulse distribution completion flag DEN (not shown) provided in the RAM area is in the logical "1" state or not, and if it is in the logical "1" state, the central processor 30 returns its routine to the base routine without executing any processing. If the flag DEN is in the logical "1" state, step 213 is reached so as to ascertain whether the AUTO counter has indicated "−1" or not. If the AUTO counter has indicated "−1", a serach is effected in step 214 for the sequence cycle table shown in FIG. 17 which defines an automatic grinding start sequence cycle, and the content of the AUTO counter is incremented by one in step 215. The processor routine is then advanced to step 216, wherein a sequence counter SEQ (not shown) provided in the RAM area for use in the reading-out of subroutine numbers is reset to indicate zero and is further advanced to step 217, wherein the number of a subroutine is read out from one of the rows designated by the sequence counter SEQ, of the automatic grinding start sequence cycle table. Subroutine number 4 stored in the first row of the sequence cycle table shown in FIG. 17 is read out at the early stage of the automatic operation.

Figure 25A:
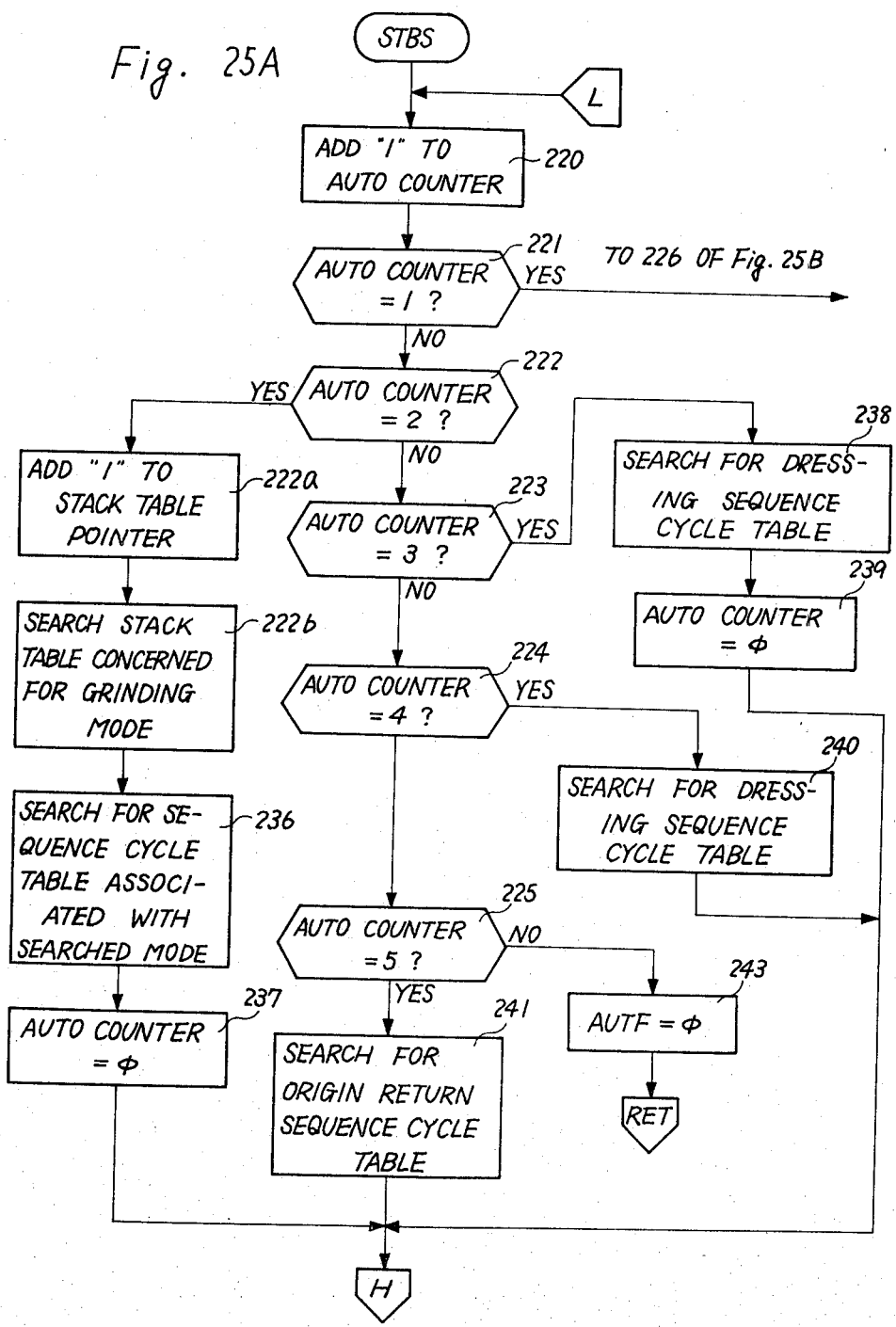
FIGS. 25A and 25B are a flow chart of a subroutine executed by the central data processor for a search of the sequence cycle tables.
Figure 25B:
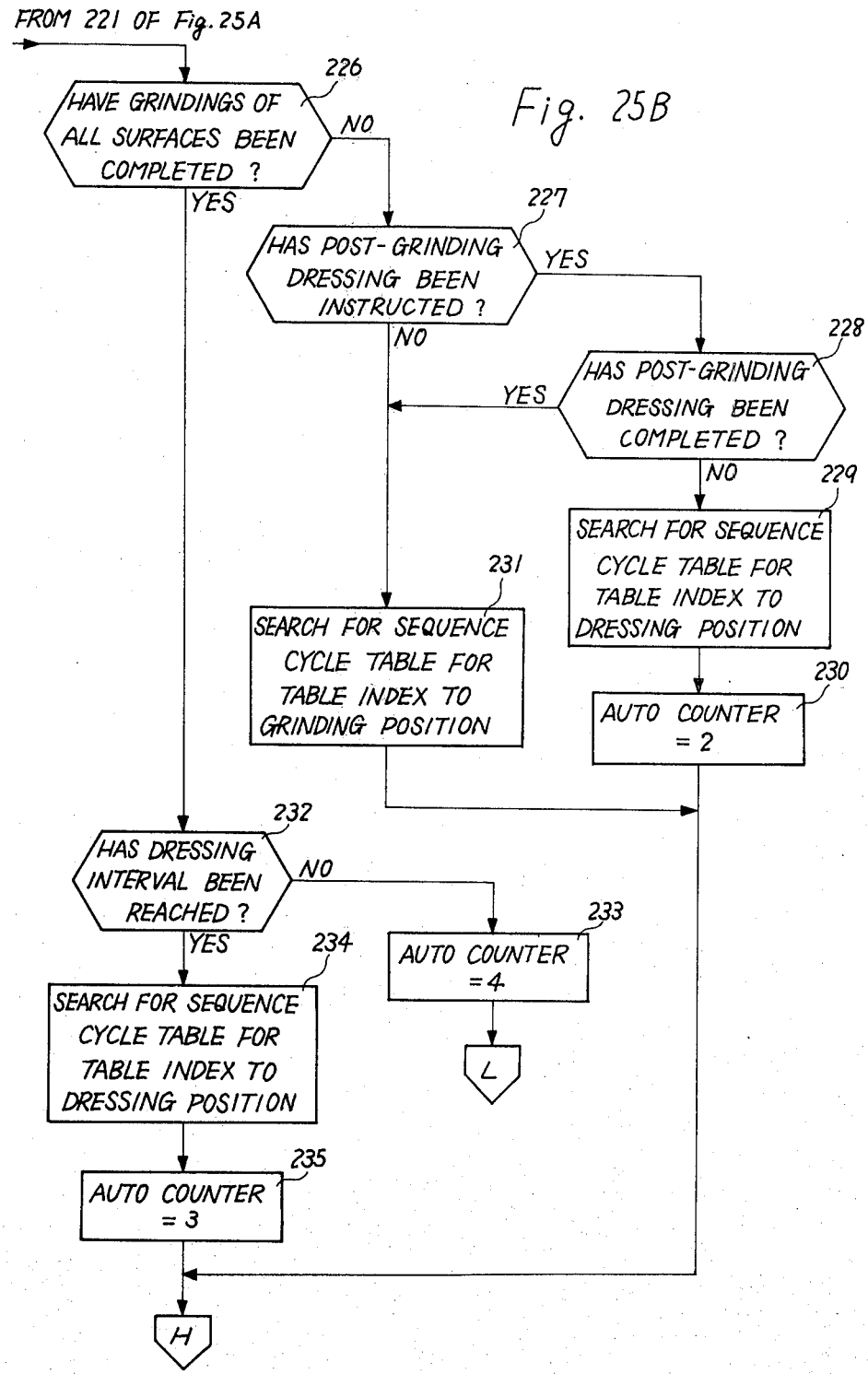

Step 218 involves ascertaining whether the read-out subroutine number indicates "−1" or not. If it indicates "−1", the completion of a presently executed operational sequence cycle is meant, and therefore, the precessor routine is returned to step 216 after a next cycle search routine STBS shown in FIGS. 25A and 25B is executed to search for one of the sequence cycle tables which defines an operational sequence cycle to be next performed. If it is confirmed in step 218 that the read-out subroutine number does not indicate "−1", step 219 is then reached to execute the subroutine that the read-out subroutine number designates, in a manner as described in detail later. The processor routine is returned to step 217 after being advanced to step 219a so as to preset in the sequence counter SEQ the number that has been stored in the next step number column or the jump destination number column of the sequence cycle table row designated by the read-out subroutine number. Accordingly, at the early stage of the automatic operation, subroutines 4, 24, 36, 39 and 30 having been designated in the automatic grinding start sequence cycle table shown in FIG. 17 are in turn executed in step 219. As a result, checking is effected with respect to a number of conditions such as, for example, wheel head original position, traverse table original position, workpiece loading completion and the like for initiating an automatic grinding operation, and a table traverse feed amount is read out from the stack table assigned to a surface to be first ground of a designated workpiece so as to be stored in a PLTOTL register which will be referred to later in connection with a pulse distribution routine. Subsequently, the traverse table 11 is indexed through the amount stored in the PLTOTL register, and the forward movement by the hydraulic actuator of the wheel head 22 and the confirmation of the wheel head forward movement are in turn performed. Upon completion of the operational sequence cycle defined by the sequence cycle table shown in FIG. 17, a jump is made to the next cycle search routine STBS so as to search for another operational sequence cycle to be next performed.

Referring now to FIGS. 25A and 25B, the routine STBS is started from step 220 which involves adding "1" to the content of the AUTO counter. Contiguous steps 221 to 225 are for choosing an operation to be next performed, by making reference to the count value of the AUTO counter. In this particular embodiment, a table index operation, a grinding operation, a dressing operation in mid course of a grinding operation, a dressing operation after a grinding operation and an original position returning operation are chosen as an operation to be next executed, respectively when the AUTO counter indicates 1 to 5.

When the AUTO counter indicates "1" in step 221, thereby instructing a table index operation to be next performed, it is ascertained in step 227 whether or not a post-one surface grinding dressing has been designated in a stack table assigned to a certain workpiece surface which has been ground just now. If the post-one surface grinding dressing has been designated, step 228 is reached so as to ascertain whether the post-one surface grinding dressing has already been completed or not. If it has not yet been completed, a search is executed in step 229 for a dressing position table index sequence cycle table (not shown) which designates a number of subroutines programmed for indexing the traverse table 11 to a predetermined dressing ready position, and then, the AUTO counter is set to indicate "2" in step 230 before jump is made to step 216 of the AUTO routine. On the other hand, if the post-one surface grinding dressing has not been instructed or has already been completed, the processor routine is advanced from step 227 or from step 228 to step 231, wherein a search is made for the table index sequence cycle table shown in FIG. 21 which is used for indexing the traverse table 11 to a next grinding position. In step 226 preceding the above-noted step 227, it is ascertained whether the grindings of all the surfaces to be ground of the designated workpiece have been completed or not. If they have been completed, an ascertainment is executed in step 232 as to whether the number of workpiece surfaces which were ground after a previous dressing is consistent with the dressing interval designation data that has been stored in the stack table assigned to a surface to be first ground of the designated workpiece, and if NO is answered, the processor routine is returned to step 220 after setting the AUTO counter to indicate "4" in step 233. If YES is answered in step 232, the same processing as executed in step 229 is executed in step 234, and a jump is made to step 216 of the AUTO routine after step 235 wherein the AUTO counter is adjusted to indicate "3".

Figures 22, 23A:
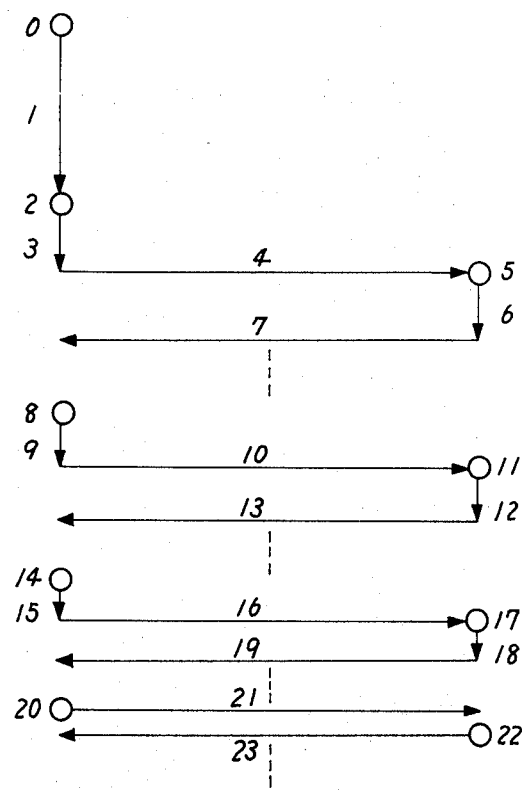

When the AUTO counter indicates "2" in step 222, thereby instructing a grinding operation to be next carried out, step 222a is executed to add "1" to a stack table pointer (not shown) which is provided in the RAM area for selecting on stack table from ten stack tables that the workpiece selector switch SW10 presently designates. It is to be noted that the stack table pointer is initialized to indicate zero each time the start push button switch ST is depressed. Subsequently, the selected stack table is searched in step 222b for grinding mode data stored therein, and the sequence cycle tables are searched in step 236 for one of them that is associated with the searched grinding mode. For example, if a first surface of a No. 1 workpiece is to be ground in plunge grinding mode, the plunge grinding sequence cycle table shown in FIG. 19 is selected in step 236 based upon the plunge grinding mode designation data stored in the first stack table 1 (FIG. 3). Alternatively, if a third surface of a No. 2 workpiece is to be ground in opposite-end infeed traverse grinding mode, the opposite-end infeed traverse grinding sequence cycle table shown in FIGS. 23A and 23B is selected in step 236 based upon the grinding mode designation data stored in the thirteenth stack table 13 (FIG. 3). Step 237 is further executed to clear the content of the AUTO counter before the jumping to step 216 of the AUTO routine.

When the AUTO counter indicates "3" in step 223, thereby instructing a dressing operation to be next performed, the sequence cycle tables are searched in step 238 for the dressing sequence cycle table (not shown) and the AUTO counter is then cleared to indicate zero in step 239 before the jumping of the processor routine to step 216 of the AUTO routine. In addition, when the AUTO counter indicates "4", thereby instructing a dressing operation to be next performed, the same processing as executed in step 238 is executed in step 240 before the jumping of the processor routine to step 216. When the grindings of all the surfaces of the designated workpiece are completed, the AUTO counter is incremented to indicate "5", and before jumping its routine to step 216, the central processor 30 executes a search in step 241 for an original position return routine (not shown) which includes a number of subroutines executed for returning the wheel head 22 and the traverse table 11 to the respective original positions.

As noted hereinabove, a jump is made from each of the steps 230, 231, 235, 237, 239 and 240 to step 216 of the AUTO routine, and the subroutines that are designated in a searched one of the sequence cycle tables are successively executed in step 219, whereby an operational sequence cycle defined by the searched sequence table is performed. Each time the execution of the operational sequence cycle is completed, a jump is made to the next cycle search routine STBS, and after the search for a next sequence cycle table, a jump is made to the AUTO routine, in step 219 of which an operational sequence cycle defined by the next sequence cycle table is then executed, so that the grindings of surfaces of a designated workpiece are successively carried out.

Figure 26:
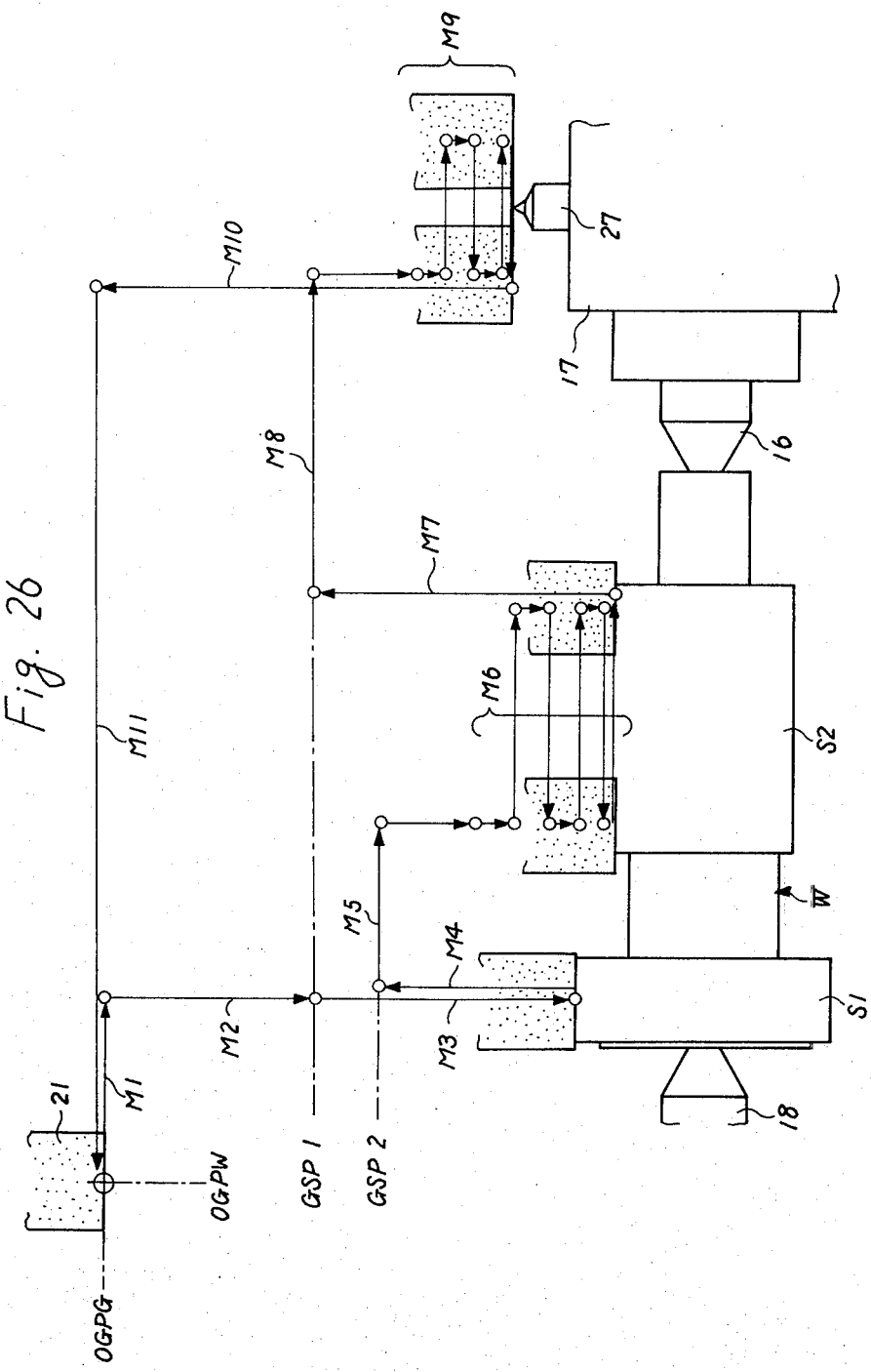
FIG. 26 is an operational cycle chart showing the operation that the grinding machine performs in a certain grinding example.

It is now assumed that the operator switches the workpiece selector switch SW10 to the No. 1 position and depresses the start button switch ST after the setting-up of a workpiece W having first and second surfaces S1 and S2 that as shown in FIG. 26, are to be ground respectively in the size control plunge grinding mode and the opposite-end infeed traverse grinding mode. The execution of the AUTO routine is initiated, and the grinding start sequence cycle table shown in FIG. 17 is searched for in step 214. The subroutines designated in the searched cycle table are in turn executed in step 219 with the result of performing a traverse table index movement M1 and a hydraulically operated wheel head rapid feed movement M2. At this time, the wheel head 22 reaches a first surface grinding start position GSP1, with the grinding wheel 21 being in axial alignment with the first surface S1. When the execution of the last subroutine designated in the searched table is completed, the processor routine is jumped in the next cycle search routine STBS and is advanced to step 222b since the AUTO counter is incremented to indicate "2" in step 220. Since grinding mode "1" has been designated at the third address of stack table 1, the plunge grinding sequence cycle table shown in FIG. 19 is searched for in step 236. A jump is then made from step 237 to the AUTO routine, and the subroutines designated in the plunge grinding sequence cycle table are successively executed in step 219. Accordingly, a wheel head plunge grinding movement M3 is performed to grind the first surface S1. The execution of the last subroutine 37 designated in the plunge grinding sequence cycle table causes the wheel head 22 to return to a second surface grinding start position GSP2.

The processor routine is jumped from step 218 to the next cycle search routine STBS and, since in step 220 the AUTO counter is incremented to indicate "1", is advanced to step 226, in which it is detected that the grindings of all the surfaces S1 and S2 of the workpiece have not been completed yet. This detection is accomplished by checking data stored at the first address of each of the stack tables that are designated by the workpiece selector switch SW10 and that are located behind the stack table which the above-noted stack table pointer presently designates. The processor routine is directed to step 227 as a result of such detection. Consider now the case where stack table 1 has not stored the instruction concerning the post-one surface grinding dressing, but has stored dressing interval instruction data "372". In this case, step 231 is then executed to search for the table index sequence cycle table shown in FIG. 21, and a jump is thereafter made to the AUTO routine, in step 219 of which the subroutines designated in the table index sequence cycle table are in turn executed, whereby a traverse table movement M5 is performed.

Upon completion of the movement M5, the processor routine runs via steps 220–222, 222a, 222b, 236, and 237 of the next cycle search routine STBS. Since in step 222b stack table 2 is searched for and data "4" is read out as grinding mode data therefrom, the opposite-end infeed traverse grinding sequence cycle table shown in FIGS. 23A and 23B is searched for in step 236. The subroutines designated in this cycle table are seccessively executed in step 219 of the AUTO routine so as to perform an opposite-end infeed traverse grinding movement M6. It is to be noted that the last subroutine 37 of the cycle table is programmed to return the wheel head 22 to the first surface grinding start position GSP1 as long as a next surface grinding start position has not been designated. Accordingly, a wheel head return movement M7 at this event is continued until the wheel head 22 reaches the first surface grinding start position GSP1.

When the execution of the last subroutine 37 is completed, a jump is made to the routine STBS, and in step 226, it is detected that the grindings of all thè surfaces S1 and S2 of the workpiece W has been completed, because no data is stored at each of the first addresses of the successive stack tables, that is, stack tables 3 to 10 in this grinding example. As a result, step 232 is executed, in which it is confirmed that the number "2" that the stack table pointer indicates at this time is in coincidence with the dressing interval instruction data "2" stored in the first stack table 1, and steps 234 and 235 are executed before a jump to step 216 of the AUTO routine. Accordingly, the above-noted table index sequence cycle table (not shown) for dressing is searched for in step 234, and the subroutines designated in the cycle table are in turn executed in step 219 of the AUTO routine, whereby a table index movement M8 is performed with the result of positioning the dressing tool 27 in the vicinity of the grinding wheel 21.

In subsequence, a jump is made to the routine STBS, in which steps 220–224 and 240 are executed, and in step 219 of the AUTO routine, the subroutines designated in the dressing sequence cycle table which is searched for in step 240 are in turn executed. Accordingly, a dressing movement M9 is carried out and the wheel head 22 is returned to the first surface grinding start position GSP1. Following this, the processor routine is advanced to step 225 of the routine STBS via steps 220–224, and since it is confirmed in step 225 that the AUTO counter indicates "5", step 241 is executed before return to the step 216 of the AUTO routine. The subroutines designated in a return sequence cycle table (not shown) which is searched for in step 241, when executed in step 219, successively results in a hydraulically operated wheel head rapid retraction movement M10 and a traverse table return index movement M11, so that the wheel head 22 and the traverse table 11 reach the respective original positions OGPG and OGPW. The processor routine is then jumped to the routine STBS, in which steps 220–225 and 243 are executed so as to reset the automatic operation flag AUTF, and is returned to the base routine, so that the automatic operation of the numerical controller is terminated.

Pulse Distribution Control

Figure 27:
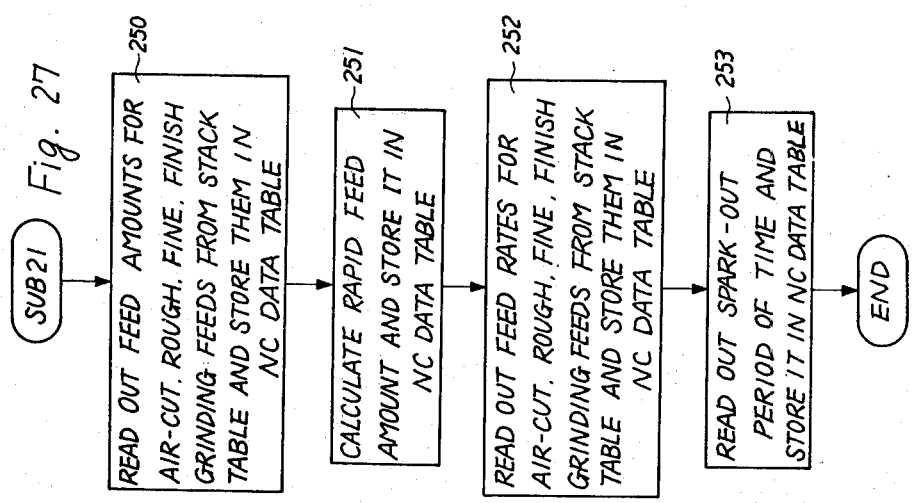
FIG. 27 is a flow chart of a subroutine executed by the central data processor for the first-stage internal setting of numerical control data.

A number of subroutines which the central processor 30 executes in the aforementioned step 219 of the AUTO routine will be described hereinafter with reference to FIGS. 27 to 29. FIG. 27 shows subroutine 21 which is designated in the plunge grinding sequence cycle table shown in FIG. 19. This subroutine is provided for setting various control parameters necessary for a plunge grinding operation in an NC data table (not shown) provided in the RAM area. The subroutine 21 includes steps 250–253, in which the central processor 30 reads out various grinding feed amount data for use in respective grinding feed steps (e.g. an air-cut feed step, a rough grinding feed step, a fine grinding feed step and a finish grinding feed step), rapid feed amount data for use in a rapid feed step, various feed rate data for use in the respective feed steps and spark-out time designation data from one of the stack tables that is designated by the stack table pointer and stores these read-out data in the corresponding storage addresses of the NC data table so as to make the same ready for subsequent plunge grinding control. The rapid feed amount data which prescribes an air-cut feed start position of the wheel head 22 is calculated from the various grinding feed amount data for use in the respective feed steps and a finish diameter of the workpiece surface to be ground.

Figure 28:
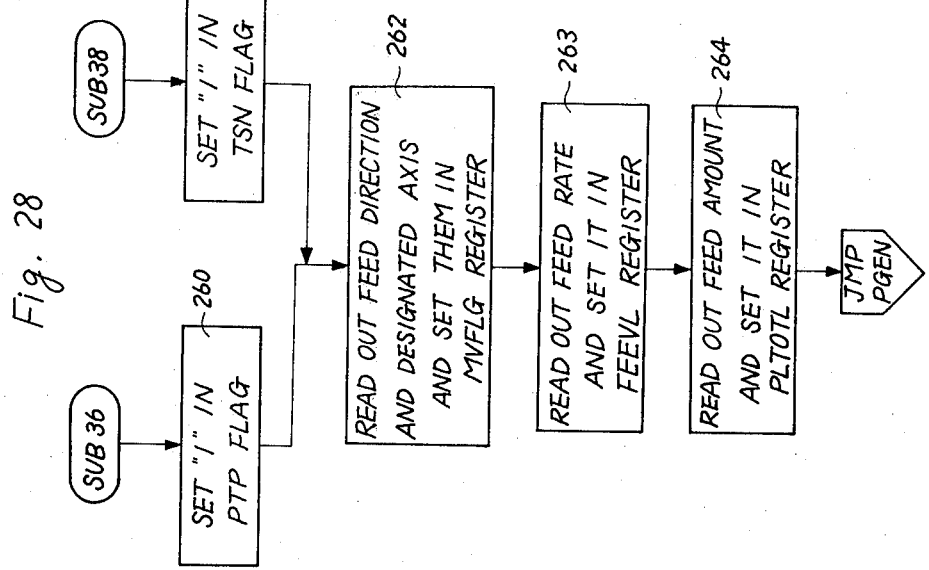
FIG. 28 is a flow chart of a subroutine executed by the central data processor for the second-stage internal setting of numerical control data.

FIG. 28 shows subroutines 36 and 38 designated also in the plunge grinding sequence cycle table shown in FIG. 19. These subroutines are provided for feed control of the wheel head 22 and the traverse table 11 and are executed in imparting any of air-cut infeed movement, rough grinding infeed movement, fine grinding infeed movement and finish grinding infeed movement to the wheel head 22 as well as in imparting index feed movement to the traverse table 11. Before the execution of step 262, a PTP flag (not shown), which, by being set, indicates that there has not been instructed size control infeed control, is set in step 260 when the subroutine 36 is executed, and a TSN flag (not shown) which, by being set, indicates that there has been instructed size control infeed control, is set in step 261 when the subroutine 38 is executed. In the contiguous steps 262 to 264, feed direction and axis designation data, feed rate data and feed amount data are read out from the corresponding addresses of the selected sequence cycle table and the NC data table and are stored respectively in MVFLG, FEEVL and PLTOTL registers (not shown) provided in the RAM area. For example, the second row of the sequence cycle table shown in FIG. 19 has stored therein, in addition to subroutine number data "36" and next step number data "2", the feed direction and axis designation data and address data which respectively designate addresses of the NC data table where the feed rate data and feed amount data have respectively been stored. Accordingly, in step 262, the direction and axis designation data is read out from the sequence cycle table so as to be stored in the MVFLAG register, and in steps 263 and 264, the feed rate data and the feed amount data are read out from the addresses of the NC data table which are designated by the address data stored in the sequence cycle table, so as to be stored in the FEEVL and PLTOTL registers, respectively.

Figure 29:
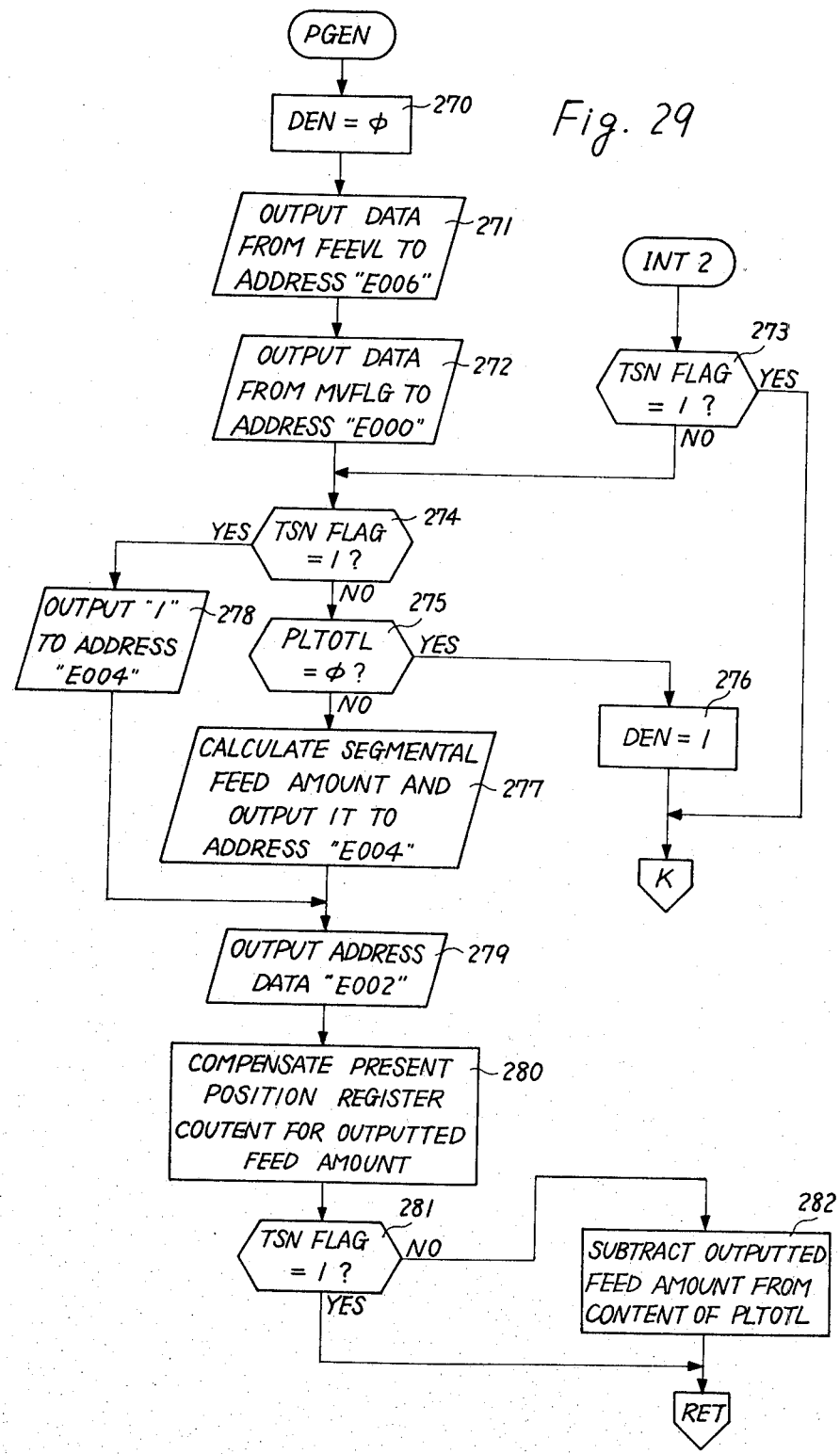
FIG. 29 is a flow chart of a subroutine executed by the central data processor for pulse distribution.

Referring now to FIG. 29, there is shown a pulse distribution routine PGEN (hereinafter called "PGEN routine") which is executed when a jump is effected thereto from the subroutines 36 and 38. The PGEN routine is also initiated whenever the feed control device 24 applies the interrupt signal INT2 to the central processor 30. When a jump is made from step 264 of the subroutines 36 and 38, the PGEN routine is started from step 270 involving setting zero in the DEN flag and is in turn advanced to steps 271 and 272, in which feed rate data and feed direction and axis designation data having been stored in the FEEVL and MVFLG registers are output together with address data "E006" and "E000" from the central processor 30 so as to be stored in the buffer registers BR21 and BR20 shown in FIG. 8, respectively. It is ascertained in step 274 whether the TSN flag for indicating size control infeed control has been set or not, and if it has not been set, step 275 is then executed so as to ascertain whether the content of the PLTOTL register has been reduced to zero or not. If the register content has been reduced to zero, it is meant that one feed operation such as wheel head rapid feed movement, wheel head rough grinding infeed movement, traverse table index movement or the like which is performed in accordance with subroutine 36, 38 or the like has been completed, and therefore, the processor routine is returned to step 219a of the AUTO routine after setting '1" in the DEN flag in step 276. On the other hand, if the register content has not been reduced to zero yet, step 277 is executed, wherein segmental feed amount data, referred to later, is output together with address data "E004" so as to be stored in the buffer register BR22 of the feed control device 24. Accordingly, when the outputting of address data "E002" in step 279 causes the loading of the segmental feed amount data into the presettable subtraction counter 80 and further causes the setting of the flip-flop FF1 and the resulting opening of the AND gate AG26, feed pulses are supplied to the subtraction input terminal DOWN of the counter 80 as well as to the positive or negative feed terminal of a selected one of the drive unit 25 and 26, whereby feed movement is imparted to the wheel head 22 or the traverse table 11. It should be noted herein that in step 277, the control processor 30 divides the feed amount data having been stored in the PLTOTL register into a number of segmental feed amount data each presettable in the subtraction counter 80, prior to outputting the first one of the divided segmental feed amount data.

Subsequently, the processor routine is advanced to step 280 so as to add the output segmental feed amount data to or subtract the same from the content of one of the present position registers which is associated with the selected drive unit 25 or 26, and this enables the display devices 56 and 57 to respectively indicate the present positions of the wheel head 22 and the traverse table 11. The same processing as executed in step 274 is executed in step 281, and if the TSN flag has still been reset, step 282 is executed to subtract the output segmental feed amount data from the rest of feed amount data having been stored in the PLTOTL register, before the processor routine is returned to the base routine. Thereafter, when the zero detection circuit 85 outputs the detection signal CONDEN as the interrupt signal INT2, step 273 is executed, and if the TSN flag is confirmed to have still been reset, the above-noted step 274 is then executed. Accordingly, in the non-size control feed control, a successive segmental feed rate data is preset in the subtraction counter 80 each time of the execution of step 279, so that feed movement of the wheel head 22 or the traverse table 11 is continued until it is confirmed in step 275 that the content of the PLTOTL register has been reduced to zero.

To the contrary, in the size control feed control, feed rate data "1" is output together with address data "E004" in step 278 following step 274, and the processor routine is returned to the base routine after the execution of steps 279 to 281. Each time one pulse is output from the frequency dividing circuit 83, the zero detection circuit 85 emits the interrupt signal INT2, and thus, step 273 is executed with the result of returning the processor routine to step 219a of the AUTO routine. Assuming now that a wheel head rough grinding infeed operation designated at the sixth row of the plunge grinding sequence cycle table shown in FIG. 19 has been in mid course of execution, subroutine 30 designated at the fifth row of the same sequence cycle table is then read out in step 217, and a first sizing signal (AS1) confirmation operation is executed in step 219 so as to confirm whether the sizing device 28 has emitted the first sizing signal AS1 or not. The central processor 30 accomplishes this confirmation processing by outputting address data indicative of an I/O address on which the first sizing signal AS1 appears if emitted, so as to read the logical state of the I/O address. If the first sizing signal AS1 has not been emitted yet, the SEQ counter is preset, in step 219a of the AUTO routine, with data "5" which is designated at the fifth row of the sequence cycle table, and subroutine 38 designated at the sixth row is read out in step 217. Thus, in step 219 of the AUTO routine, the central processor 30 in turn executes steps 261 and 264 of subroutine 38 and steps 270 to 272, 274 and 278 to 281 of the PGEN routine and after the execution of step 273, advances its routine to step 219a of the AUTO routine so as to preset the SEQ counter again with data "5". That is, the wheel head rough infeed operation and the first sizing signal confirmation operation are reciprocately and repeatedly executed until the sizing device 28 emits the first sizing signal AS1, and one pulse is supplied to the selected pulse motor 23 each time the rough infeed operation is executed. When the emission of the first sizing signal AS1 is confirmed, the SEQ counter is preset, in step 219a of the AUTO routine, with data "6" designated at the fifth row of the plunge sequence cycle table shown in FIG. 19, and a second sizing signal (AS2) confirmation operation and a wheel head fine infeed operation are thereafter alternately and repeatedly executed since they are so designated in the plunge grinding sequence cycle table.

Although in the above-described embodiment, grinding mode data and various control parameters necessary for the grinding of a workpiece surface are stored in the same data stack table, it may otherwise be possible to provide a storage area for storing the grinding mode data in a separate fashion with respect to the various control parameters. Also, the above-described embodiment employs as control parameter requesting means a plurality of pilot lamps each composed of a radiating diode. However, in subsitution for these pilot lamps, there may be used a cathode ray tube display device for displaying the various control parameters to be input, in the form of letters or characters. Further, it is also possible to provide a plurality of switches each capable of designating any of a number of grinding modes, in correspondence respectively to workpiece surfaces to be ground and to perform the grinding of a workpiece surface in one of the grinding modes which is designated by one of the switches corresponding to the workpiece surface.

Obviously, numerous additional modifications and variations of the present invention are possible in light of the above teachings. It is therefore to be understood that within the scope of the appended claims, the invention may be otherwise practiced than as specifically described herein.

What is claimed as new and desired to be secured by Letters Patent of the United States is:

1. A numerical controller, including a central processor, for controlling a grinding machine having a wheel head for supporting a grinding wheel, a work table for supporting a workpiece, and first and second servomechanisms connected to said wheel head and said worktable for relatively moving the same along first and second axes, said numerical controller comprising:
   memory means connected to said central processor for storing and retrieving data, including:
   a number of parameter kind storage means corresponding respectively to a number of grinding modes in any one of which a surface of said workpiece is ground and each storing a plurality of kinds of control parameters necessary for grinding said workpiece surface in a corresponding one of said grinding modes;
   mode storage means for storing one of said grinding modes in which said workpiece is to be ground;
   a data stack table for storing written-in control parameters;
   operational sequence storage means for storing a number of operational sequence programs corresponding respectively to said grinding modes, each of said operational sequence programs prescribing the manner in which a series of relative movements between said wheel head and said work table are to be performed in a corresponding one of said grinding modes;
   data write-in means connected to said central processor and manually operable for writing data into memory including writing control parameters into said data stack table;
   read-out means connected to said central processor for receiving and displaying data retrieved from storage, including reading out said kinds of said control parameters from one of said parameter kind storage means which corresponds to said one of said grinding modes stored in said mode storage means, and visibly displaying said kinds of said control parameters read out so as to thereby request the writing-in of those control parameters;
   said central processor being connected to said mode storage means for selecting one of said operational sequence programs which corresponds to said one of said grinding modes stored in said mode storage means; and
   feed control means connected to said central processor and to said first and second servomechanisms for controlling the servomechanisms in accordance with said one of said operational sequence programs selected by said central processor and said control parameters stored in said data stack table.

2. A numerical controller as set forth in claim 1, wherein:
   said mode storage means is located at a predetermined storage area of said data stack table; and
   said data write-in means is manually operable also to write said one of said grinding modes in said predetermined storage area of said data stack table.

3. A numerical controller as set forth in claim 1, wherein:
   said data write-in means includes a set of numeric keys for inputting numeric data and a write-in command key for writing in said data stack table any numeric data input by said numeric keys.

4. A numerical controller as set forth in claim 3, wherein:
   said data write-in means further includes a next-step command key for instructing the read-out means to display the kind of one of said control parameters which is to be next written in said data stack table; and
   said read-out means is responsive to the depression of said next-step command key for reading out one by one the kinds of said control parameters stored in said one of said parameter kind storage means which corresponds to said one of said grinding modes stored in said mode storage means.

5. A numerical controller as set forth in claim 4, wherein:
   said read-out means includes a plurality of pilot lamps provided for respectively indicating the kinds of said control parameters which are stored in said parameter kind storage means.

6. A numerical controller as set forth in claim 5, wherein said read-out means includes:
   a first numeric display device connected to said set of said numeric keys for visibly displaying any numeric data input by said set of said numeric keys.

7. A numerical controller as set forth in claim 6, wherein said read-out means includes:
   a second numeric display device connected to said data stack table for visibly displaying any numeric data which is stored in said data stack table upon the depression of said write-in command key.

8. A numerical controller, including a central processor for controlling a grinding machine having a wheel head for rotatably supporting a grinding wheel, a work table for rotatably carrying a cylindrical workpiece having a number of axially spaced surfaces to be ground, and first and second servomechanisms connected to said wheel head and said work table for relatively moving the same along first and second axes, said numerical controller comprising:
   memory means connected to said central processor for storing and retrieving data including:
   a number of parameter kind storage means corresponding respectively to a number of grinding modes in any of which any of said workpiece surfaces are ground, each of said parameter kind storage means storing the kinds of control parameters necessary for grinding any of said workpiece surfaces in a corresponding one of said grinding modes;

a number of data stack tables associated respectively with said number of said workpiece surfaces, each capable of storing one of said grinding modes in which said associated one of said workpiece surfaces is to be ground and a plurality of said control parameters necessary for grinding said associated one of said workpiece surfaces;

operational sequence storage means for storing a number of operational sequence programs corresponding respectively to said grinding modes, each of said operational sequence programs prescribing the manner in which a series of relative movement between said wheel head and said work table are to be performed in a corresponding one of said grinding modes;

data write-in means connected to said central processor and operable for writing data into memory, including writing said control parameters into said data stack tables;

read-out means connected to said central process for receiving and displaying data retrieved from storage, including reading out said kinds of said control parameters from one of said parameter kind storage means corresponding to said grinding mode stored in a designated one of said data stack tables and visibly displaying said kinds of said control parameters read out so as to thereby request the writing-in of these parameters;

said central processor being connected to selectively designate said number of said data stack tables, and also connected to said data stack tables for selecting one of said operational sequence programs which corresponds to said one of said grinding modes stored in said designated one of said data stack tables; and feed control means connected to said central processor and to said first and second servomechanisms for controlling the servomechanisms in accordance with said selected one of said operational sequence programs and said control parameters stored in said one of said data stack tables.

9. A numerical controller as set forth in claim 8, wherein:
said data write-in means includes a set of numeric keys for inputting any numeric data and a write-in command key for writing any numeric data, input by said set of said numeric keys, in said designated on of said data stack tables.

10. A numerical controller as set forth in claim 9, wherein:
said data write-in means further includes a next-step command key for instructing the read-out means to display the kind of one of said control parameters which is to be next written in said designated one of said data stack tables; and
said read-out means is responsive to the depression of said next-step command key for reading out one by one the kinds of said control parameters.

11. A numerical controller as set forth in claim 10, wherein:
said read-out means includes a plurality of pilot lamps provided for respectively indicating the kinds of said control parameters which are to be stored in said designated one of said data stack tables.

12. A numerical controller as set forth in claim 11, wherein said read-out means includes
a first numeric display device connected to said set of said numeric keys for visibly displaying any numeric data input by said set of said numeric keys; and
a second numeric display device for visibly displaying any numeric data which is stored in said designated one of said data stack tables upon the depression of said write-in command key.

13. A numerical controller as set forth in claim 8, wherein said memory means further includes: standard parameter storage means for storing respective standard values of a part of said control parameters; and
wherein said central processor transfers said standard values from said standard parameter storage means to said designated one of said data stack tables.

14. A numerical controller as set forth in claim 13, wherein:
said data write-in means includes a repeat command key manually operable for enabling said central processor to execute said transferring of said standard values.

15. A numerical controller as set forth in claim 14, wherein:
said standard parameter storage means includes a number of standard parameter stack tables each for storing respective standard values of control parameters which are necessary for the grinding in one of said grinding modes; and
said central processor includes storage area selection means for selecting one of said standard parameter stack tables in accordance with said grinding mode stored in said designated one of said data stack tables, wherein said central processor transfers said standard values from said selected one of said standard parameter stack tables to said designated one of said data stack tables.

16. A numerical controller as set forth in claim 15, wherein:
said data write-in means is manually operable for writing said standard values in any of said standard parameter stack tables and for revising said standard values stored in said designated one of said data stack tables.

17. A numerical controller including a central processor for controlling a grinding machine having a wheel head for rotatably supporting a grinding wheel, a work table for rotatably carrying a cylindrical workpiece having a number of axially spaced surfaces to be ground, a first servomechanism connected to said wheel head for moving the same toward and away from said work table and a second servomechanism connected to said work table for moving the same in an axial direction of said workpiece to thereby position said workpiece to said grinding wheel, said numerical controller comprising:
memory means connected to said central processor for storing and retrieving data including,
data stack table means for storing a number of reference index position data to which said work table is in turn indexed respectively prior to the grindings of said workpiece surfaces;
said central processor receiving data from said memory means so as to detect the present position of said work table, said present position being expressed as an absolute value, to calculate the difference between said present position data and one of said reference index position data which is programmed and stored in said data stack table means in relation to said one of said workpiece surfaces, and to compensate all of said reference index position data, stored in said data stack table means, for said difference calculated;

data write-in means connected to said central processor for enabling the same to operate and for writing data into memory, including writing said number of said reference index position data expressed as an absolute value into said data stack table means;

manual pulse generator means connected to said second servomechanism and manually operable for indexing said work table to a desired position suitable for grinding one of said workpiece surfaces; and feed control means connected to said central processor and to said second servomechanism for controlling the servomechanism in accordance with said compensated reference index position data so as to thereby successively index said worktable respectively prior to the grindings of said workpiece surfaces.

* * * * *